(12) United States Patent
Takezawa et al.

(10) Patent No.: US 7,357,531 B2
(45) Date of Patent: Apr. 15, 2008

(54) LIGHT SOURCE DEVICE AND PROJECTOR

(75) Inventors: Takeshi Takezawa, Matsumoto (JP); Koichi Akiyama, Matsumoto (JP); Toshiaki Hashizume, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 163 days.

(21) Appl. No.: 11/222,960

(22) Filed: Sep. 12, 2005

(65) Prior Publication Data

US 2006/0056184 A1 Mar. 16, 2006

(30) Foreign Application Priority Data

Sep. 14, 2004 (JP) ............... 2004-267407
Jun. 22, 2005 (JP) ............... 2005-182336

(51) Int. Cl.
*H01J 61/35* (2006.01)
*H21V 13/00* (2006.01)

(52) U.S. Cl. ............ 362/263; 362/268; 362/297; 313/634

(58) Field of Classification Search ............ 362/261, 362/299, 298, 262, 263, 268, 297, 538; 313/634, 313/635; 352/198, 203
See application file for complete search history.

(56) References Cited

U.S. PATENT DOCUMENTS

| | | | | |
|---|---|---|---|---|
| 6,094,008 A | * | 7/2000 | Omori et al. | 313/634 |
| 6,623,145 B2 | * | 9/2003 | Ishihara | 362/346 |
| 6,695,461 B2 | * | 2/2004 | Ozawa et al. | 362/268 |
| 7,232,241 B2 | | 6/2007 | Takezawa | |
| 2004/0095765 A1 | * | 5/2004 | Hataoka et al. | 362/263 |

FOREIGN PATENT DOCUMENTS

| | | |
|---|---|---|
| EP | 1 450 100 A1 | 8/2004 |
| EP | 1 462 850 A1 | 9/2004 |
| EP | 1 594 157 A2 | 11/2005 |
| GB | 1 409 904 | 10/1975 |
| JP | A 08-031382 | 2/1996 |
| JP | A 09-120067 | 5/1997 |
| JP | A 2001-125197 | 5/2001 |
| WO | WO 2004/020898 A1 | 3/2004 |

\* cited by examiner

*Primary Examiner*—Sandra O'Shea
*Assistant Examiner*—Bao Q. Truong
(74) *Attorney, Agent, or Firm*—Oliff & Berridge, PLC

(57) ABSTRACT

In a light source device (10), relations of $\theta1 \leq \mathrm{Tan}^{-1}$ (Hd/(2f1)) and T1<H≦Hd are established, where a diameter of a circle defining an edge on the neck (121) side of a usable-light reflection area in a reflecting portion (122) of a main reflecting mirror (12) is Hd, a distance between the edge on the neck (121) side of the usable-light reflection area of the reflecting portion (122) of the main reflecting mirror (12) and an emitting center O of an emitting portion (1111) in a central axis direction of the light beam irradiated from the light source device (10) is f1, an opening diameter of a base end in an extending direction of the neck (121) is H, a diameter of sealing portion (1112, 1113) is T1, and an angle formed by lines connecting inflection points (IP1) between the emitting portions (1111) and the sealing portion (1112) with the emitting center of the emitting portion (1111) and the central axis of the light beam irradiated from the light source device (10) is θ1.

32 Claims, 15 Drawing Sheets

LIGHT SOURCE DEVICE AND PROJECTOR

BACKGROUND OF THE INVENTION

1. Field of the Invention

The present invention relates to a light source device and a projector.

2. Description of Related Art

Conventionally, there has been used a projector that modulates a light beam irradiated from a light source in accordance with image information to project an optical image in an enlarged manner.

A discharge light source device such as a metal halide lamp and a high-pressure mercury lamp has been used as a light source device for such projector (see, for instance, Reference: Japanese Laid-Open Patent Publication No. 08-31382).

The light source device includes; a discharge emitting tube having an emitting portion that generates a light beam by electric discharge between electrodes, and sealing portions provided on both sides of the emitting portion; and a main reflecting mirror having a reflecting surface that irradiates the light beam irradiated from the discharge emitting tube to align the light beam in a predetermined direction.

One of the sealing portions of the discharge emitting tube can be inserted into the main reflecting mirror, the main reflecting mirror having a neck extending along the one of the sealing portions.

The discharge emitting tube is fixed to the main reflecting mirror by positioning light-emitting center of the emitting portion of the discharge emitting tube on a focus position of the main reflecting mirror with the one of the sealing portions of the discharge emitting tube being inserted into the neck of the main reflecting mirror, and by applying an adhesive between the inner circumference of the neck and the outer circumference of the one of the sealing portions.

The discharge emitting tube described above is generally molded by blow-molding as follows.

First, an untreated glass tube is heat-softened on a predetermined position which is to be the emitting portion. Next, a die that defines a shape of the emitting portion is applied to the predetermined portion from the outer circumference of the glass tube, and the predetermined position is inflated by sending air into the glass tube. The air is sent until the outer circumference of the inflated glass tube touches the inner circumferential surface of the die.

In such discharge emitting tube, since the emitting portion is inflated as described above, there exists curved surface connecting the outer circumference of the emitting portion and the outer circumference of the sealing portion in the vicinity of a boundary between the sealing portion and the emitting portion. Inflection points exist in the curved surface connecting the outer circumference of the emitting portion and the outer circumference of the sealing portion. The inflection points is a position changing a refraction direction in which the light irradiated from the emitting center of the emitting portion is reflected when the light is passed through the glass tube and irradiated from the outer circumferential surface of the emitting portion.

Specifically, a light beam irradiated from the emitting center of the emitting portion and irradiated from the outer circumferential surface on the emitting portion side relative to the inflection points (hereinafter referred to as first beam) is likely refracted in a direction orthogonal to an illumination optical axis of the light beam irradiated form the light source device. On the other hand, a light beam irradiated from the emitting center of the emitting portion and irradiated from the outer circumferential surface on the sealing portion side relative to the inflection points (hereinafter referred to as second beam) is likely refracted in a direction toward the illumination optical axis.

Incidentally, the main reflecting mirror described above includes a usable-light reflection area that reflects the light beam irradiated from the emitting portion as a usable light illuminating an object to be illuminated, and two unusable-light reflection areas that cannot reflect the light beam irradiated from the emitting portion as a usable light illuminating the object to be illuminated as described below.

A first unusable-light reflection area is in an opening of the neck. Specifically, in a light beam irradiated from the emitting portion, the light beam traveling toward the opening of the neck is not reflected by the reflecting surface of the main reflecting mirror, which does not illuminate the object to be illuminated.

A second unusable-light reflection area is on a side close to the one of the sealing portions on the reflecting surface of the main reflecting mirror, in other words, in the vicinity of the opening of the neck. More specifically, the second unusable-light reflection area reflects an unusable light that is shielded by the emitting tube and cannot be irradiated on the object to be illuminated even when the light beam irradiated from the emitting portion is reflected by the main reflecting mirror.

When the inflection points on the connecting portion of the emitting portion and the sealing portion are positioned closer to the emitting portion, an area on the sealing portion side relative to the inflection point, where the second beam is irradiated, becomes larger on the outer circumferential surface of the emitting portion from which the light is irradiated. Since the second beam is likely refracted in a direction toward the illumination optical axis, in the light beam irradiated from the emitting portion of the emitting center and traveling toward the usable-light reflection area of the main reflecting mirror under the condition where the refraction on the outer circumferential surface of the emitting portion is not considered, amount of the light beam traveling toward the unusable-light reflection area of the main reflecting mirror might increase. Under such condition, the light utilization efficiency of the light beam irradiated from the emitting portion is lowered. Thus, there has been a demand for a light source device with the positions of the inflection points being defined for enhancing the light utilization efficiency of the light beam irradiated from the emitting portion.

SUMMARY OF THE INVENTION

Exemplary aspect of the present invention provides a light source device capable of enhancing the light utilization efficiency of a light beam irradiated from an emitting portion, and a projector.

A light source device according to an exemplary aspect of the present invention can include: a light source lamp including an emitting tube having a discharge space and a pair of electrodes disposed in the discharge space of the emitting tube; and a reflector for reflecting a light beam irradiated from the light source lamp, in which: the emitting tube includes an emitting portion having the discharge space thereinside and sealing portions provided on both sides of the emitting portion, the reflector includes a cylindrical neck extending along a first sealing portion of the sealing portions of the emitting tube and a reflecting portion that extends from a base end in an extending direction of the neck to have a substantially concave cross section, the reflecting portion reflecting the light beam irradiated from the light source lamp to align in a predetermined direction, the light source lamp is so disposed that an emitting center of the emitting portion is positioned on a focus position of the reflecting portion of the reflector, an outer circumference of the emitting portion and an outer circumference of the sealing portion are connected at a connecting portion having an inflection point, when a diameter of a circle defining a edge on the neck side of a usable-light reflection area of the reflecting portion of the reflector is Hd, a distance between the edge on the neck side of the usable-light reflection area of the reflecting portion of the reflector and the emitting center of the emitting portion in a central axis direction of the light beam irradiated from the light source device is F, an opening diameter of the neck on the base end in the extending direction is H, a diameter of the sealing portion is T1, and an angle formed by a line connecting the inflection point between the emitting portion and the first sealing portion with the emitting center of the emitting portion and the central axis of the light beam irradiated from the light source device is θ1, relations are established as follows.

$$\theta 1 \leq \text{Tan}^{-1}(Hd/(2F))$$ [Formula 1]

$$T1 < H \leq Hd$$ [Formula 2]

In the light source device according to the exemplary aspect of the present invention, it is preferable that the inflection point is positioned so that the line connecting the inflection point between the emitting portion and the first sealing portion with the emitting center of the emitting portion intersects the edge on the neck side of the usable-light reflection area of the reflecting portion of the reflector.

In the light source device according to the exemplary aspect of the present invention, it is preferable that the edge on the neck side of the usable-light reflection area of the reflecting portion of the reflector is a boundary of an area where a light irradiated as an illumination light of the light source device is reflected and another area where a light shielded by the emitting tube is reflected in the reflecting portion of the reflector.

In the light source device according to the exemplary aspect of the present invention, it is preferable that the emitting center is an intersecting point of a central axis of the emitting tube along the extending direction of the sealing portions and a cross section of the largest diameter of the emitting portion along a plane orthogonal to the central axis.

Here, either of a parabolic reflector or an ellipsoidal reflector may be used as the reflector.

The parabolic reflector has a reflecting surface formed like a revolution paraboloid shape, the parabolic reflector reflecting the light beam irradiated from the light source disposed on the focus position on the revolution paraboloid and irradiating the light beam parallel to an illumination optical axis. Thus, a second unusable-light reflection area, where the light is shielded by the emitting tube even when the light is reflected by the parabolic reflector, is positioned within a cylindrical area enclosed by lines passing through most-bulged portions of the emitting portion of the emitting tube of the light source lamp and parallel to the illumination optical axis. In other words, the diameter Hd of the circle defining the edge on the neck side of the usable-light reflection area of the parabolic reflector is equal to the outer diameter T2 at the most-bulged portion of the emitting portion.

Thus, when the diameter of the circle defining the edge on the neck side of the usable-light reflection area of the reflecting portion of the parabolic reflector is Hd, and the distance between the edge on the neck side of the usable-light reflection area of the reflecting portion of the parabolic reflector and the emitting center of the emitting portion in the central axis direction of the light beam irradiated from the light source device is F, and when the light source lamp is so disposed that the emitting center of the emitting portion is positioned on the focus position of the parabolic reflector, the light beam passing through the emitting center and having angle θ defined by Formula 3 (shown below) relative to the illumination optical axis is incident with the smallest angle in the light beam incident on the usable-light reflection area.

$$\theta = \text{Tan}^{-1}(Hd/(2F))$$ [Formula 3]

The ellipsoidal reflector has a reflecting surface formed by a revolution ellipsoid, the ellipsoidal reflector reflecting the light beam irradiated from the light source disposed on a first focus position and converging the light beam on a second focus position. Thus, a second unusable-light reflection area, where the light beam is shielded by the emitting tube even when the light beam is reflected by the ellipsoidal reflector, is positioned within a conical area enclosed by lines connecting the most-bulged portions of the emitting portion of the emitting tube of the light source lamp or an edge of a second sealing portion positioned away from the ellipsoidal reflector with the second focus position.

The conical area enclosed by the lines connecting the most-bulged portions of the emitting portion of the emitting tube of the light source lamp with the second focus position is, when the outer diameter at the most-bulged portion of the emitting portion is T2, and the distance between the second focus position of the ellipsoidal reflector and the most-bulged portions of the emitting portion in the central axis direction of the light beam irradiated from the light source device is Fa, a conical area in which lines connecting the most-bulged portions of the emitting portion of the emitting tube of the light source lamp with the second focus position have angle θa defined by Formula 4 (shown below) relative to the central axis of the light beam irradiated from the light source device.

$$\theta a = \text{Tan}^{-1}(T2/(2Fa))$$ [Formula 4]

On the other hand, the conical area enclosed by the lines connecting the edge of the second sealing portion positioned away from the ellipsoidal reflector with the second focus position is, when the outer diameter of the sealing portion positioned away from the ellipsoidal reflector is T1, and the distance between the second focus position of the ellipsoidal reflector and the edge of the second sealing portion in the central axis direction of the light beam irradiated from the light source device is Fb, a conical area in which lines connecting the edge of the second sealing portion and the second focus position have angle θb defined by Formula 5 (shown below) relative to the central axis of the light beam irradiated from the light source device.

$$\theta b = \text{Tan}^{-1}(T1/(2Fb))$$ [Formula 5]

Therefore, the second unusable-light reflection area of the ellipsoidal reflector is positioned within the conical area enclosed by the lines having greater angle of angle θa defined by Formula 4 and angle θb defined by Formula 5, and the diameter Hd of the circle defining the edge on the neck side of the usable-light reflection area of the reflecting portion of the ellipsoidal reflector is the diameter of a circle defining an intersecting position of the reflecting portion and the conical area enclosed by the lines having greater angle of angle θa defined by Formula 4 and angle θb defined by Formula 5.

In other words, when the distance between the edge on the neck side of the usable-light reflection area of the reflecting portion of the ellipsoidal reflector and the second focus position in the central axis direction of the light beam irradiated from the light source device is Fc under the condition of angle θa>angle θb, the diameter Hd of the circle defining the edge on the neck side of the usable-light reflection area in the reflection portion of the ellipsoidal reflector is a length defined by Formula 6.

$$Hd = (Fc \cdot \text{Tan } \theta a) \cdot 2 \quad \text{[Formula 6]}$$

On the other hand, when the distance between the edge on the neck side of the usable-light reflection area of the reflecting portion of the ellipsoidal reflector and the second focus position in the central axis direction of the light beam irradiated from the light source device is Fc under the condition of angle θa<angle θb, the diameter Hd of the circle defining the edge on the neck side of the usable-light reflection area of the reflecting portion of the ellipsoidal reflector is a length defined by Formula 7.

$$Hd = (Fc \cdot \text{Tan } \theta b) \cdot 2 \quad \text{[Formula 7]}$$

Thus, when the diameter of the circle defining the edge on the neck side of the usable-light reflection area of the reflecting portion of the ellipsoidal reflector is Hd, and the distance between the edge on the neck side of the usable-light reflection area of the reflecting portion of the ellipsoidal reflector and the emitting center of the emitting portion in the central axis direction of the light beam irradiated from the light source device is F, and when the light source lamp is so disposed that the emitting center of the emitting portion is positioned on the first focus position of the ellipsoidal reflector, the light beam passing through the emitting center and having angle θ defined by Formula 8 (shown below) relative to the central axis of the light beam irradiated from the light source device is incident with the smallest angle in the light beam incident on the usable-light reflection area.

$$\theta = \text{Tan}^{-1}(Hd/(2F)) \quad \text{[Formula 8]}$$

In the exemplary aspect of the present invention, since the opening diameter H on the base side in the extending direction of the neck is set to be equal to or smaller than the diameter Hd of the circle defining the edge on the neck side of the usable-light reflection area of the reflecting portion of the reflector as shown in Formula 2 described above, the opening of the neck, namely the first unusable-light reflection area can securely be positioned within the second unusable-light reflection area defined by Formulae 3 and 8 described above, so that the unusable-light reflection area of the reflector can be defined only to the second unusable-light reflection area.

By setting the opening diameter H on the base side in the extending direction of the neck so as to be greater than the diameter T1 of the sealing portion as shown in Formula 2, the sealing portion can be inserted into the neck, so that the light source lamp can be properly supported by the neck.

Therefore, by setting the opening diameter H on the base side in the extending direction of the neck as shown in Formula 2, the unusable-light reflection area is not unnecessarily enlarged, which allows effective utilization of the light beam irradiated from the emitting center.

The light source lamp is so disposed that the emitting center of the emitting portion is positioned on the focus position of the reflector, and by setting the angle formed by the lines connecting the inflection points on the connecting portion of the emitting portion and the first sealing portion with the emitting center of the emitting portion and the central axis of the illumination light beam of the light source device to be angle θ1 as shown in Formula 1, the inflection points on the connecting portion of the emitting portion and the first sealing portion can be positioned so that, the light beam irradiated from the emitting center toward the usable-light reflection area of the reflector and having the smallest angle relative to the central axis of the illumination light beam under the condition where the refraction on the outer circumferential surface of the emitting portion is not considered can be irradiated from the emitting portion as the first beam.

Incidentally, in a case where θ1 is set to be out of the range of Formula 1 and, for instance, θ1 is greater than $\text{Tan}^{-1}(Hd/(2F))$, when the parabolic reflector is employed as the reflector, the inflection points on the connecting portion of the emitting portion and the first sealing portion on the reflector side are positioned so that the lines connecting the inflection points on the connecting portion of the emitting portion and the first sealing portion on the reflector side with the emitting center are positioned out of the second unusable-light reflection area defined in Formula 3 of the parabolic reflector, namely within the usable-light reflection area. Likewise, when the ellipsoidal reflector is employed as the reflector, the inflection points on the reflector side are positioned so that the lines connecting the inflection points on the connecting portion of the emitting portion and the first sealing portion on the reflector side with the emitting center are positioned out of the second unusable-light reflection area defined by Formula 8 of the ellipsoidal reflector, namely within the usable-light reflection area. By positioning the inflection points on the reflector side as described above, a part of the light beam irradiated from the emitting center and traveling toward the usable-light reflection area of the reflector under the condition where the refraction on the outer circumferential surface of the emitting portion is not considered is refracted on the outer circumferential surface of the emitting portion via the emitting tube to be the second beam, which travels toward the second unusable-light reflection area of the reflector. Therefore, amount of the light beam refracted on the outer circumferential surface of the emitting portion via the emitting tube to be irradiated from the emitting portion and traveling toward the usable-light reflection area of the reflector becomes small, in other words, the light utilization efficiency of the light beam irradiated from the emitting portion is lowered.

In the exemplary aspect of the present invention, by setting θ1 to be equal to or smaller than $\text{Tan}^{-1}(Hd/(2F))$ as shown in Formula 1, the inflection points on the connecting portion of the emitting portion and the first sealing portion on the reflector side are positioned so that the light beam incident on the usable-light reflection area with the smallest angle defined by Formulae 3 and 8 can be incident on the edge on the neck side of the usable-light reflection area. Thus, all of the light beam irradiated from the emitting center and traveling toward the usable-light reflection area of the reflector under the condition where the refraction on the outer circumferential surface of the emitting portion is not considered is refracted on the outer circumferential surface of the emitting portion via the emitting tube to be the first beam, which securely travels toward the usable-light reflection area of the reflector without traveling toward the second unusable-light reflection area of the reflector. Thus, the light beam irradiated from the emitting center and traveling toward the unusable-light reflection area of the reflector under the condition where the refraction on the outer circumferential surface of the emitting portion is not considered can also be set so that a part of the light beam refracted on the outer circumferential surface of the emitting portion via the emitting tube to be the first beam travels toward the usable-light reflection area of the reflector. Therefore, amount of the light beam refracted on the outer circumferential surface of the emitting portion via the emitting tube to be irradiated from the emitting portion and traveling toward the usable-light reflection area of the reflector can be increased, thereby enhancing the light utilization efficiency of the light beam irradiated from the emitting portion.

A light source device according to another exemplary aspect of the present invention can include: a light source lamp including an emitting tube having a discharge space and a pair of electrodes disposed in the discharge space of the emitting tube; a reflector that reflectes a light beam irradiated from the light source lamp; and a sub-reflecting mirror with a reflecting surface thereof being disposed opposite to a reflecting surface of the reflector that reflectes a part of the light beam irradiated from the light source lamp toward the discharge space, in which: the emitting tube includes an emitting portion having the discharge space thereinside and sealing portions provided on both sides of the emitting portion; the reflector includes a cylindrical neck extending along a first sealing portion of the sealing portions of the emitting tube and a reflecting portion that extends from a base end in an extending direction of the neck to have a substantially concave cross section, the reflecting portion reflecting the light beam irradiated from the light source lamp to align in a predetermined direction; the light source lamp is so disposed that an emitting center of the emitting portion is positioned on a focus position of the reflecting portion of the reflector; the sub-reflecting mirror is formed in a hemispherical shape covering an emitting portion of the emitting tube, the sub-reflecting mirror having an opening to which the second sealing portion of the emitting tube can be inserted that attaches the sub-reflecting mirror to the emitting tube; an outer circumference of the emitting portion and an outer circumference of the sealing portion are connected at a connecting portion having an inflection point; when a diameter of a circle defining a edge on the neck side of a usable-light reflection area of the reflecting portion of the reflector is Hd, a distance between the edge on the neck side of the usable-light reflection area of the reflecting portion of the reflector and the emitting center of the emitting portion in a central axis direction of the light beam irradiated from the optical device is F, an opening diameter of the neck on the base end in the extending direction is H, a diameter of the sealing portion is T1, and an angle formed by a line connecting the inflection point between the emitting portion and the first sealing portion with the emitting center of the emitting portion and the central axis of the light beam irradiated from the light source device is θ1, relations are established as follows.

$$\theta 1 \leq \text{Tan}^{-1}(Hd/(2F))$$ [Formula 9]

$$T1 < H \leq Hd$$ [Formula 10]

In the light source device according to the exemplary aspect of the present invention, it is preferable that the inflection point is positioned so that the line connecting the inflection point between the emitting portion and the first sealing portion with the emitting center of the emitting portion intersects the edge on the neck side of the usable-light reflection area of the reflecting portion of the reflector.

In the light source device according to the exemplary aspect of the present invention, it is preferable that the edge on the neck side of the usable-light reflection area of the reflecting portion of the reflector is a boundary of an area where a light irradiated as an illumination light of the light source device is reflected and another area where a light shielded by the emitting tube is reflected of the reflecting portion of the reflector.

In the light source device according to the exemplary aspect of the present invention, it is preferable that the edge on the neck side of the usable-light reflection area of the reflecting portion of the reflector is a boundary of an area where a light irradiated as an illumination light of the light source device is reflected and another area where a light shielded by the sub-reflecting mirror is reflected in the reflecting portion of the reflector.

In the light source device according to the another exemplary aspect of the present invention, it is preferable that the emitting center is an intersecting point of a central axis of the emitting tube along the extending direction of the sealing portions and a cross section of the largest diameter of the emitting portion along a plane orthogonal to the central axis.

Here, either of a parabolic reflector or an ellipsoidal reflector may be used as the reflector, as with the light source device described above.

In the exemplary aspect of the present invention, since the light source device includes a hemispherical sub-reflecting mirror for covering the emitting portion, unlike the light source device described above, the second unusable-light reflection area is an area where the light is shielded by the second sealing portion of the emitting tube or the sub-reflecting mirror even when the light is reflected by the reflector.

Specifically, when a parabolic reflector is employed as the reflector, the second unusable-light reflection area, where the light is shielded by the emitting tube and the sub-reflecting mirror even when the light is reflected by the parabolic reflector, is positioned within a cylindrical area enclosed by lines passing through the most-bulged portions of the sub-reflecting mirror and parallel to the central axis of the light beam irradiated from the light source device. In other words, the diameter Hd of the circle defining the edge on the neck side of the usable-light reflection area of the parabolic reflector is equal to the largest diameter S1 as the outer diameter at the most-bulged portion of the sub-reflecting mirror.

Thus, when the diameter of the circle defining the edge on the neck side of the usable-light reflection area of the reflecting portion of the parabolic reflector is Hd, and the distance between the edge on the neck side of the usable-light reflection area of the reflecting portion of the parabolic reflector and the emitting center of the emitting portion in the central axis direction of the light beam irradiated from the light source device is F, and when the light source lamp is so disposed that the emitting center of the emitting portion is positioned on the focus position of the parabolic reflector, the light beam passing through the emitting center and having angle θ defined by Formula 11 (shown below) relative to the central axis of the light beam irradiated from the light source device is incident with the smallest angle in the light beam incident on the usable-light reflection area.

$$\theta = \text{Tan}^{-1}(Hd/(2F))$$ [Formula 11]

On the other hand, when an ellipsoidal reflector is employed as the reflector, the second unusable-light reflection area of the ellipsoidal reflector, where the light is shielded by the emitting tube and the sub-reflecting mirror even when the light irradiated from the emitting portion is reflected by the ellipsoidal reflector, is positioned within a conical area enclosed by lines connecting the most-bulged portions of the sub-reflecting mirror or an end of the second sealing portion positioned away from the ellipsoidal reflector with the second focus position.

The conical area enclosed by lines connecting the most-bulged portions of the sub-reflecting mirror with the second focus position is, when the outer diameter at the most-bulged portion of the sub-reflecting mirror, i.e. the largest outer diameter of the sub-reflecting mirror is S1, and the distance between the second focus position of the ellipsoidal reflector and the most-bulged portions of the sub-reflecting mirror in the central axis direction of the light beam irradiated from the light source device is Fd, a conical area in which the lines connecting the most-bulged portions of the sub-reflecting mirror with the second focus position have angle θd defined by Formula 12 (shown below) relative to the central axis of the light beam irradiated from the light source device.

$$\theta d = \text{Tan}^{-1}(S1/(2Fd)) \quad \text{[Formula 12]}$$

On the other hand, the conical area enclosed by lines connecting the end of the second sealing portion positioned away from the ellipsoidal reflector with the second focus position is, when the outer diameter of the second sealing portion positioned away from the ellipsoidal reflector is T1, and the distance between the second focus position of the ellipsoidal reflector and the end of the second sealing portion positioned away from the ellipsoidal reflector in the central axis direction of the light beam irradiated from the light source device is Fe, a conical area in which the lines connecting the end of the second sealing portion positioned away from the ellipsoidal reflector with the second focus position have angle θe defined by Formula 13 (shown below) relative to the central axis of the light beam irradiated from the light source device.

$$\theta e = \text{Tan}^{-1}(T1/(2Fe)) \quad \text{[Formula 13]}$$

Therefore, the second unusable-light reflection area of the ellipsoidal reflector is positioned within the conical area enclosed by the lines having greater angle of angle θd defined by Formula 12 and angle θe defined by Formula 13, and the diameter Hd of the circle defining the edge on the neck side of the usable-light reflection area of the reflecting portion of the ellipsoidal reflector is the diameter of a circle defining an intersecting position of the reflecting portion and the conical area enclosed by the lines having greater angle of angle θd defined in Formula 12 and angle θe defined in Formula 13.

In other words, when a distance between the edge on the neck side of the usable-light reflection area of the reflecting portion of the ellipsoidal reflector and the second focus position in the central axis direction of the light beam irradiated from the light source device is Ff under the condition of angle θd>θe, the diameter Hd of the circle defining the edge on the neck side of the usable-light reflection area of the reflecting portion of the ellipsoidal reflector is a length defined by Formula 14.

$$Hd = (Ff \text{Tan } \theta d) \cdot 2 \quad \text{[Formula 14]}$$

On the other hand, when a distance between the edge on the neck side of the usable-light reflection area of the reflecting portion of the ellipsoidal reflector and the second focus position in the central axis direction of the light beam irradiated from the light source device is Ff under the condition of angle θd<θe, the diameter Hd of the circle defining the edge on the neck side of the usable-light reflection area of the reflecting portion of the ellipsoidal reflector is a length defined by Formula 15.

$$Hd = (Ff \text{Tan } \theta e) \cdot 2 \quad \text{[Formula 15]}$$

Thus, when the diameter of the circle defining the edge on the neck side of the usable-light reflection area of the reflecting portion of the ellipsoidal reflector is Hd, and the distance between the edge on the neck side of the usable-light reflection area of the reflecting portion of the ellipsoidal reflector and the emitting center of the emitting portion in the central axis direction of the light beam irradiated from the light source device is F, and when the light source lamp is so disposed that the emitting center of the emitting portion is positioned on the first focus position of the ellipsoidal reflector, the light beam passing through the emitting center and having angle θ defined by Formula 16 (shown below) relative to the central axis of the light beam irradiated from the light source device is incident with the smallest angle in the light beam incident on the usable-light reflection area.

$$\theta = \text{Tan}^{-1}(Hd/(2F)) \quad \text{[Formula 16]}$$

In the exemplary aspect of the present invention, since the opening diameter H on the base end in the extending direction of the neck is set to be equal to or smaller than the diameter Hd of the circle defining the edge on the neck side of the usable-light reflection area of the reflecting portion of the reflector as shown in Formula 10 described above, the opening of the neck, namely the first unusable-light reflection area of the reflector can securely be positioned within the second unusable-light reflection area defined by Formulae 11 and 16 described above, so that the unusable-light reflection area of the reflector can be defined only to the second unusable-light reflection area.

By so setting the opening diameter H on the base end in the extending direction of the neck as to be greater than the diameter T1 of the sealing portion as shown in Formula 10, the sealing portion can be inserted into the neck, so that the light source lamp can be properly supported by the neck.

Therefore, by setting the opening diameter H on the base end in the extending direction of the neck as shown in Formula 10, the unusable-light reflection area of the reflector is not unnecessarily enlarged, which allows effective utilization of the light beam irradiated from the emitting center.

The light source lamp is so disposed that the emitting center of the emitting portion is positioned on the focus position of the reflector, and by setting angle θ1 formed by the lines connecting the inflection points on the connecting portion of the emitting portion and the first sealing portion on the reflector side with the emitting center of the emitting portion and the central axis of the light beam irradiated from the light source device as shown in Formula 9, the inflection points on the reflector side of the emitting portion can be positioned so that the light beam irradiated from the emitting center toward the usable-light reflection area of the reflector and having the smallest angle relative to the central axis of the light beam irradiated from the light source device under the condition where the refraction on the outer circumferential surface of the emitting portion is not considered can be irradiated from the emitting portion as the first beam.

Incidentally, in a case where θ1 is set to be out of the range of Formula 9, for instance, θ1 is greater than $\text{Tan}^{-1}(Hd/(2F))$, when the parabolic reflector is employed as the reflector, the inflection points on the connecting portion of the emitting portion and the first sealing portion on the reflector side are positioned so that the lines connecting the inflection points on the connecting portion of the emitting portion and the first sealing portion on the reflector side with the emitting center are positioned out of the second unusable-light reflection area of the parabolic reflector defined by Formula 11, namely within the usable-light reflection area.

Likewise, when the ellipsoidal reflector is employed as the reflector, the inflection points of the connecting portion of the emitting portion and the first sealing portion on the reflector side are positioned so that the lines connecting the inflection points on the connecting portion of the emitting portion and the first sealing portion on the reflector side with the emitting center are positioned out of the second unusable-light reflection area of the ellipsoidal reflector defined by Formula 16, namely within the usable-light reflection area. By positioning the inflection points on the reflector side, a part of the light beam irradiated from the emitting center and traveling toward the usable-light reflection area of the reflector under the condition where the refraction on the outer circumferential surface of the emitting portion is not considered is refracted on the outer circumferential surface of the emitting portion via the emitting tube to be the second beam, which travels toward the second unusable-light reflection area of the reflector. Therefore, amount of the light beam refracted on the outer circumferential surface of the emitting portion via the emitting tube to be irradiated from the emitting portion and traveling toward the usable-light reflection area of the reflector becomes small, in other words, the light utilization efficiency of the light beam irradiated from the emitting portion is lowered.

In the exemplary aspect of the present invention, by setting θ1 to be equal to or smaller than $\tan^{-1}(Hd/(2F))$ as shown in Formula 9, the inflection points on the reflector side of the emitting portion are positioned so that the light beam incident on the usable-light reflection area with the smallest angle defined by Formulae 11 and 16 can be incident on the edge of the usable-light reflection area. Thus, all of the light beam irradiated from the emitting center and traveling toward the usable-light reflection area of the reflector under the condition where the refraction on the outer circumferential surface of the emitting portion is not considered is refracted on the outer circumferential surface of the emitting portion via the emitting tube to be the first beam, which securely travels toward the usable-light reflection area of the reflector without traveling toward the second unusable-light reflection area of the reflector. Thus, the light beam irradiated from the emitting center and traveling toward the unusable-light reflection area of the reflector under the condition where the refraction on the outer circumferential surface of the emitting portion is not considered can also be set so that a part of the light beam refracted on the outer circumferential surface of the emitting portion via the emitting tube to be the first beam travels toward the usable-light reflection area of the reflector. Therefore, amount of the light beam refracted on the outer circumferential surface of the emitting portion via the emitting tube to be irradiated from the emitting portion and traveling toward the usable-light reflection area of the reflector can be increased, thereby enhancing the light utilization efficiency of the light beam irradiated from the emitting portion.

In the light source device according to the another exemplary aspect of the present invention, when a diameter of the emitting portion is T2, an opening diameter of the sub-reflecting mirror is S2, a distance between the opening of the sub-reflecting mirror and the emitting center of the emitting portion in the central axis direction of the light beam irradiated from the light source device is C, and an angle formed by the line connecting the inflection point between the emitting portion and the second sealing portion with the emitting center of the emitting portion and the central axis of the light beam irradiated from the light source device is θ2, the relations are preferably established as follows.

$$\theta 2 \leq \tan^{-1}(S2/(2C)) \qquad \text{[Formula 17]}$$

$$T1 < S2 \leq T2 \qquad \text{[Formula 18]}$$

In the light source device according to the another exemplary aspect of the present invention, it is preferable that the inflection point is positioned so that the line connecting the inflection point between the emitting portion and the second sealing portion with the emitting center of the emitting portion intersects the opening of the sub-reflecting mirror.

Here, the unusable-light reflection area of the sub-reflecting mirror is an opening to which the second sealing portion is inserted. That is to say, the light beam irradiated from the emitting portion and traveling toward the opening of the sub-reflecting mirror is not reflected by the reflecting surface of the sub-reflecting mirror, which is not reflected toward the emitting portion.

By setting the diameter S2 of the opening of the sub-reflecting mirror so as to be greater than the diameter T1 of the sealing portion as shown in Formula 18, the sealing portion can be inserted into the sub-reflecting mirror, so that the sub-reflecting mirror can be properly attached to the sealing portion. Thus, when the diameter of the opening of the sub-reflecting mirror is S2 and the distance between the opening of the sub-reflecting mirror and the emitting center of the emitting portion in the central axis direction of the light beam irradiated from the light source device is C, the light beam passing through the emitting center and having angle θ defined by Formula 19 (shown below) relative to the central axis of the light beam irradiated from the light source device is incident with the smallest angle in the light beam incident on the reflecting surface (usable-light reflection area) of the sub-reflecting mirror.

$$\theta = \tan^{-1}(S2/(2C)) \qquad \text{[Formula 19]}$$

In the exemplary aspect of the present invention, the light source lamp is so disposed that the emitting center of the emitting portion is positioned on the focus position of the sub-reflecting mirror, and by setting angle θ2 formed by the lines connecting the inflection points on the connecting portion of the emitting portion and the sealing portion on the sub-reflecting mirror side with the emitting center of the emitting portion and the central axis of the light beam irradiated from the light source device as shown in Formula 17, the inflection points on the connecting portion of the emitting portion and the second sealing portion on the sub-reflecting mirror side can be positioned so that, the light beam irradiated from the emitting center toward the usable-light reflection area of the sub-reflecting mirror and having the smallest angle relative to the central axis of the light beam irradiated from the light source device under the condition where the refraction on the outer circumferential surface of the emitting portion is not considered is irradiated from the emitting portion as the first beam.

Incidentally, in a case where θ2 is set to be out of the range of Formula 17, for instance, when θ2 is greater than $\tan^{-1}(S2/(2C))$, the inflection points on the connecting portion of the emitting portion and the sealing portion on the sub-reflecting mirror side are positioned so that the lines connecting the inflection points on the connecting portion of the emitting portion and the second sealing portion on the sub-reflecting mirror side with the emitting center are positioned out of the opening (unusable-light reflection area) of the sub-reflecting mirror, namely within the reflecting surface (usable-light reflection area). By positioning the inflection points on the connecting portion of the emitting portion and the second sealing portion on the sub-reflecting mirror side as described above, a part of the light beam irradiated from the emitting center and traveling toward the reflecting surface (usable-light reflection area) of the sub-reflecting mirror under the condition where the refraction on the outer circumferential surface of the emitting portion is not considered is refracted on the outer circumferential surface of the emitting portion via the emitting tube to be the second beam, which travels toward the opening (unusable-light reflection area) of the sub-reflecting mirror. Therefore, amount of the light beam refracted on the outer circumferential surface of the emitting portion via the emitting tube to be irradiated from the emitting portion and traveling toward the reflecting surface (usable-light reflection area) of the sub-reflecting mirror becomes small, in other words, the light utilization efficiency of the light beam irradiated from the emitting portion is lowered.

In the exemplary aspect of the present invention, by setting θ2 to be equal to or smaller than $\tan^{-1}(S2/(2C))$ as shown in Formula 17, the inflection points on the connecting portion of the emitting portion and the second sealing portion on the sub-reflecting mirror side can be positioned so that the light beam incident on the usable-light reflection area with the smallest angle defined by Formula 19 can be incident on the edge of the usable-light reflection area. By setting as described above, all of the light beam irradiated from the emitting center and traveling toward the reflecting surface (usable-light reflection area) of the sub-reflecting mirror under the condition where the refraction on the outer circumferential surface of the emitting portion is not considered is refracted on the outer circumferential surface of the emitting portion via the emitting tube to be the first beam, which securely travels toward the reflecting surface (usable-light reflection area) of the sub-reflecting mirror without traveling toward the opening (unusable-light reflection area) of the sub-reflecting mirror. Thus, a part of the light beam irradiated from the emitting center and traveling toward the opening (unusable-light reflection area) of the sub-reflecting mirror under the condition where the refraction on the outer circumferential surface of the emitting portion is not considered can also be set to be the first beam which travels toward the reflecting surface (usable-light reflection area) of the sub-reflecting mirror. Therefore, amount of the light beam refracted on the outer circumferential surface of the emitting portion via the emitting tube to be irradiated from the emitting portion and traveling toward the reflecting surface (usable-light reflection area) of the sub-reflecting mirror can be increased, in other words, the light utilization efficiency of the light beam irradiated from the emitting portion can further be enhanced.

In the light source device according to the another exemplary aspect of the present invention, it is preferable that angle θ1 and angle θ are equal.

In the exemplary aspect of the present invention, by positioning the inflection points on the connecting portion of the emitting portion and the first sealing portion on the reflector side and on the connecting portion of the emitting portion and the second sealing portion in a manner symmetrical on the emitting portion, the shape of the emitting tube can be easily formed.

In the light source device according to the exemplary aspect of the present invention, it is preferable that the inflection point of the emitting tube is moved to a position satisfying the relations by grinding and/or polishing the outer circumferential surface of the emitting portion.

In the exemplary aspect of the present invention, by machining (grinding and/or polishing) the outer circumferential surface of the emitting portion, the positions of the inflection points on the emitting portion can be changed, so that the light utilization efficiency of the light beam irradiated from the emitting portion can be easily enhanced.

In the light source device according to the exemplary aspect of the present invention, it is preferable that the emitting tube is a molding blow-molded using a die that is capable of forming the inflection point satisfying the relations.

In the exemplary aspect of the present invention, by performing blow-molding using a molding die with positions of the inflection points having been set in advance, desired inflection points can be formed on the emitting portion, thereby easily enhancing the light utilization efficiency of the light beam irradiated from the emitting portion. Further, since after-treatment such as machining is not required, the light source device capable of enhancing the light utilization efficiency can be easily manufactured.

A projector according to still another aspect of the present invention can include: the above-described light source device according to the exemplary aspect of the present invention; an optical modulator that modulates a light beam irradiated from the light source device in accordance with image information; and a projection optical device that projects the light beam modulated by the optical modulator in an enlarged manner.

In the exemplary aspect of the present invention, since the projector includes the above-described light source device, the optical modulator and the projection optical device, the same functions and advantages as the above-described light source device can be obtained Further, since the projector includes the light source device capable of enhancing the light utilization efficiency, a projection image with proper brightness can be formed.

If an arrangement where the brightness is not changed is employed, luminance of the light source device can be lowered, thus saving consumption of electric power.

DETAILED DESCRIPTION OF PREFERRED EMBODIMENT(S)

1 First Exemplary Embodiment

A first exemplary embodiment of the present invention will be described below with reference to the attached drawings.

[Arrangement of Projector]

Figure 1:
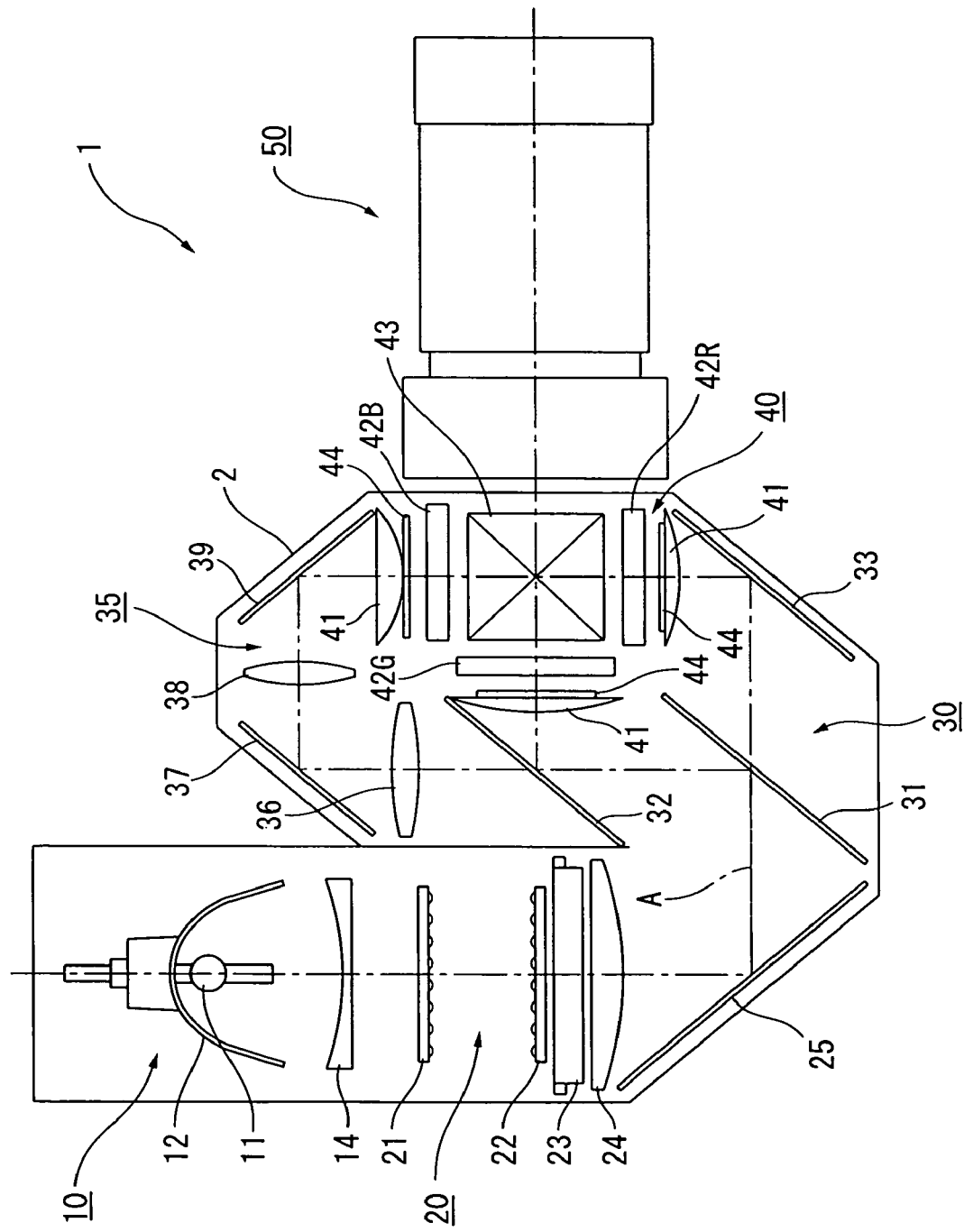
FIG. 1 is a schematic view showing an optical system of a projector according to a first exemplary embodiment.

FIG. 1 is a schematic view showing an optical system of a projector 1 according to a first exemplary embodiment.

The projector 1 modulates a light beam irradiated from a light source in accordance with image information to form an optical image, and projects the optical image on a screen in an enlarged manner.

As shown in FIG. 1, the projector 1 includes a light source device 10, an integrator illumination optical system 20, a color separating optical system 30, a relay optical system 35, an optical device 40 and a projection optical system (projection optical device) 50, and optical elements including these optical system 20 through 35 and the optical device 40 are positioned and stored in an optical component casing 2 in which a predetermined illumination optical axis A is set.

The light source device 10 irradiates the light beam irradiated from a light source lamp to align in a predetermined direction and illuminates the optical device 40. Although described later in detail, the light source device 10 includes a light source lamp 11, a main reflecting mirror 12 and a lamp housing (not shown) that holds the light source lamp 11 and the main reflecting mirror 12, and a parallelizing concave lens 14 is provided on the downstream in a light-irradiation direction of the main reflecting mirror 12. The parallelizing concave lens 14 may be integrated with the light source device 10 or separated therefrom.

A light beam irradiated from the light source lamp 11 is irradiated toward the front side of the light source device 10 by the main reflecting mirror 12 as a convergent light with the irradiation direction being aligned, which is parallelized by the parallelizing concave lens 14 and irradiated toward the integrator illumination optical system 20.

The central axis of the light beam irradiated from the light source device 10 corresponds to an illumination optical axis A.

FIG. 1 shows an arrangement where an ellipsoidal reflector is employed as the main reflecting mirror 12, and in an arrangement where a parabolic reflector is employed as the main reflecting mirror 12, the parallelizing concave lens 14 is omitted.

The integrator illumination optical system 20 splits the light beam irradiated from the light source device 10 into a plurality of sub-beams to uniform in-plane illuminance of an illumination area. The integrator illumination optical system 20 includes a first lens array 21, a second lens array 22, a polarization converter 23, a superposing lens 24 and a reflecting mirror 25.

The first lens array 21 serves as a light-splitting optical element for splitting the light beam irradiated from the light source device 10 into a plurality of sub-beams, and includes a plurality of small lenses arranged in a matrix in a plane orthogonal to the illumination optical axis A.

The second lens array 22 condenses the plurality of sub beams split by the first lens array 21 described above, the second lens array 22 including a plurality of small lenses arranged in a matrix on a plane orthogonal to the illumination optical axis A, as in the first lens array 21

The polarization converter 23 aligns the polarization direction of each of the sub-beams split by the first lens array 21 into linear polarization in substantially one direction.

Although not illustrated, the polarization converter 23 has an arrangement in which polarization separating films and reflection films each inclined relative to the illumination optical axis A are alternately arranged. The polarization separating film transmits either one of P polarized light beam or S polarized light beam contained in each of the sub-beam and reflects the other one of the polarized light beams. The reflected polarized light beam is bent by the reflection film and is irradiated in the irradiation direction of the transmitted polarized light beam, i.e. along the illumination optical axis A. Either one of the irradiated polarized light beams is polarization-converted by a phase plate provided on the light-irradiation side of the polarization converter 23 so that the polarization direction of all of the polarized light beams are aligned. With the use of the polarization converter 23, the light beam irradiated from the light source lamp 11 can be aligned as a polarized light beam substantially in one direction, thereby enhancing the utilization ratio of the light source beam used in the optical device 40.

The superposing lens 24 is an optical element for condensing the plurality of sub-beams that have passed through the first lens array 21, the second lens array 22 and the polarization converter 23 to superpose the sub-beams on an image formation area of three liquid crystal panels (described later) of the optical device 40.

The light beam irradiated by the superposing lens 24 is bent by the reflecting mirror 25 to be irradiated to the color-separating optical system 30.

The color-separating optical system 30 includes two dichroic mirrors 31 and 32, and a reflecting mirror 33, in which the plurality of sub-beams irradiated from the integrator illumination optical system 20 are separated by the dichroic mirrors 31 and 32 into three color lights of red (R), green (G) and blue (B).

The dichroic mirrors 31 and 32 are optical elements with wavelength-selection films formed on a substrate, the films reflecting the light beam with a predetermined wavelength range and transmitting other light beam. The dichroic mirror 31 disposed on the upstream of an optical path transmits a red light and reflects other color lights. The dichroic mirror 32 disposed on the downstream of the optical path reflects the green light and transmits the blue light.

The relay optical system 35 includes an incident-side lens 36, a relay lens 38 and reflecting mirrors 37 and 39, and guides the blue light transmitted through the dichroic mirror 32 of the color-separating optical system 30 to the optical device 40. Incidentally, the relay optical system 35 is used for the optical path of the blue light in order to avoid deterioration in the light utilization efficiency on account of light dispersion and the like caused by the longer length of the optical path of the blue light than those of the optical paths of the other color lights. In the present exemplary embodiment, the above arrangement is employed because the length of the optical path of the blue light is longer, but an arrangement using the relay optical system 35 for the optical path of the red light by setting the length of the optical path of the red light to longer may also be employed.

The red light separated by the above-described dichroic mirror 31 is bent by the reflecting mirror 33 and, subsequently, fed to the optical device 40 via a field lens 41. The green light separated by the dichroic mirror 32 is directly fed to the optical device 40 via the field lens 41. The blue light is condensed and bent by the lenses 36, 38 and the reflecting mirrors 37 and 39 of the relay optical system 35 to be fed to the optical device 40 through the field lens 41. Incidentally, the field lenses 41 provided on the upstream of the respective color lights of the optical device 40 convert the respective sub-beams irradiated by the second lens array 22 into a light beam parallel to a main beam of the respective sub-beams.

The optical device 40 modulates the incident light beam in accordance with the image information to form a color image. The optical device 40 includes liquid crystal panels (optical modulators) 42R, 42G and 42B (42R for red light, 42G for green and 42B for blue light) as objects to be illuminated, and a cross dichroic prism 43. Incident-side polarization plates 44 are respectively interposed between the field lenses 41 and the liquid crystal panels 42R, 42G and 42B, and irradiation-side polarization plates (not shown) are respectively interposed between the liquid crystal panels 42R, 42G and 42B and the cross dichroic prism 43, where optical modulation for each of the incident color lights is performed by the incident-side polarization plates 44, the liquid crystal panels 42R, 42G and 42B and the irradiation-side polarization plates.

Each of the liquid crystal panels 42R, 42G and 42B is a pair of transparent glass substrates with liquid crystal (electrooptic material) sealed therebetween, which modulates the polarization direction of the polarized light beam irradiated by the incident-side polarization plate 44 in accordance with a given image signal using, for instance, polycrystalline silicon TFT as a switching element.

The cross dichroic prism 43 is an optical element for combining the optical images irradiated by the above-described irradiation-side polarization plates and modulated for each color light to form a color image. The cross dichroic prism 43 has a square shape in plan view with four right-angle prisms attached with each other, and dielectric multi-layered films are formed on the boundaries adhering the respective right-angle prisms. One of the multi-layered films arranged generally in X-shape reflects the red light, and the other multi-layer film reflects the blue light. These multi-layered films bend the red light and the blue light to align them with the advancing direction of the green light, thereby combining the three color lights.

The color image irradiated from the cross dichroic prism 43 is projected by the projection optical system 50 in an enlarged manner to form a large-sized screen image on a screen (not shown).

[Arrangement of Optical Device]

Figure 2:
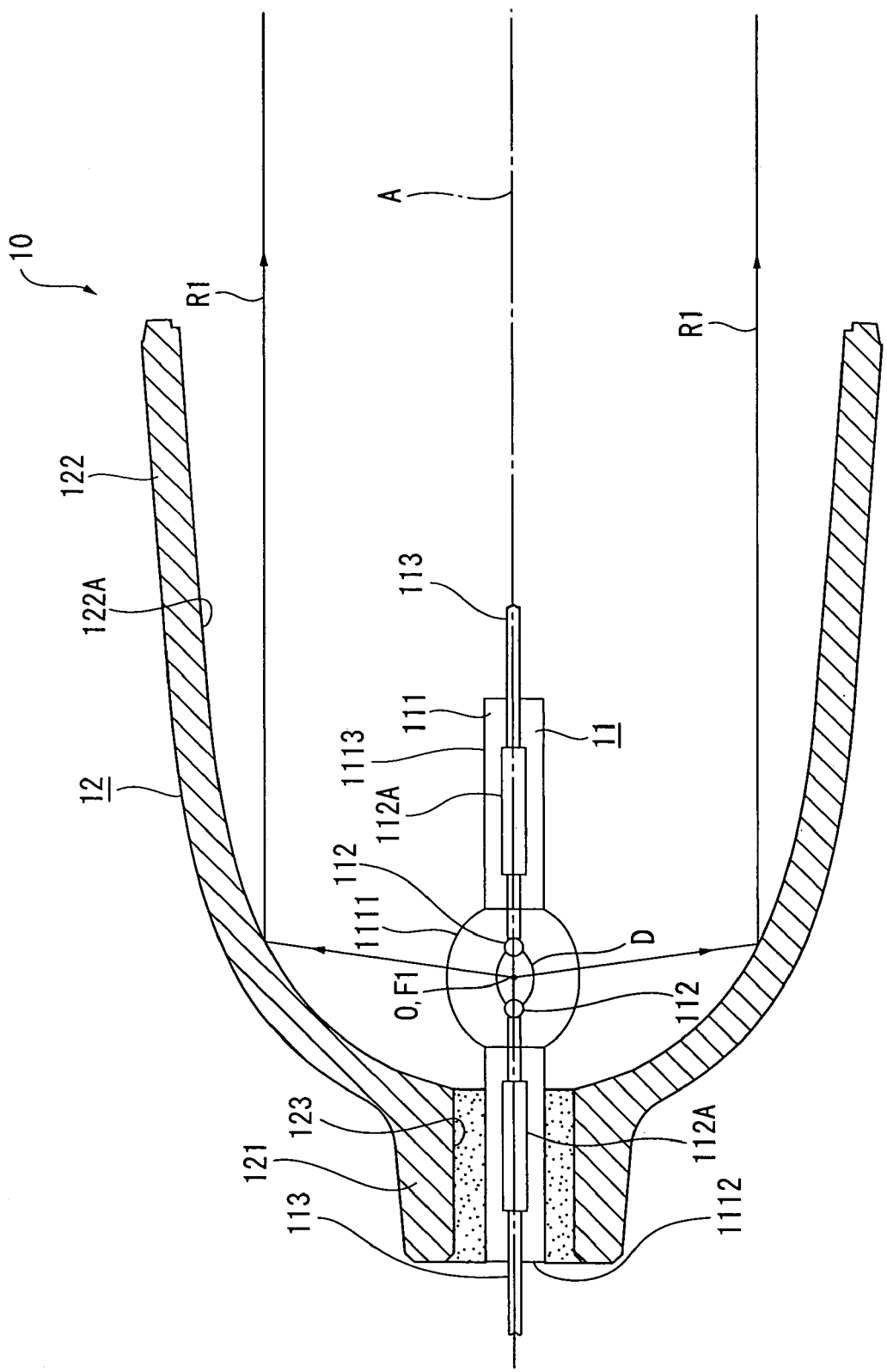
FIG. 2 is a cross section showing the outline of a light source device of the exemplary embodiment.
Figure 3:
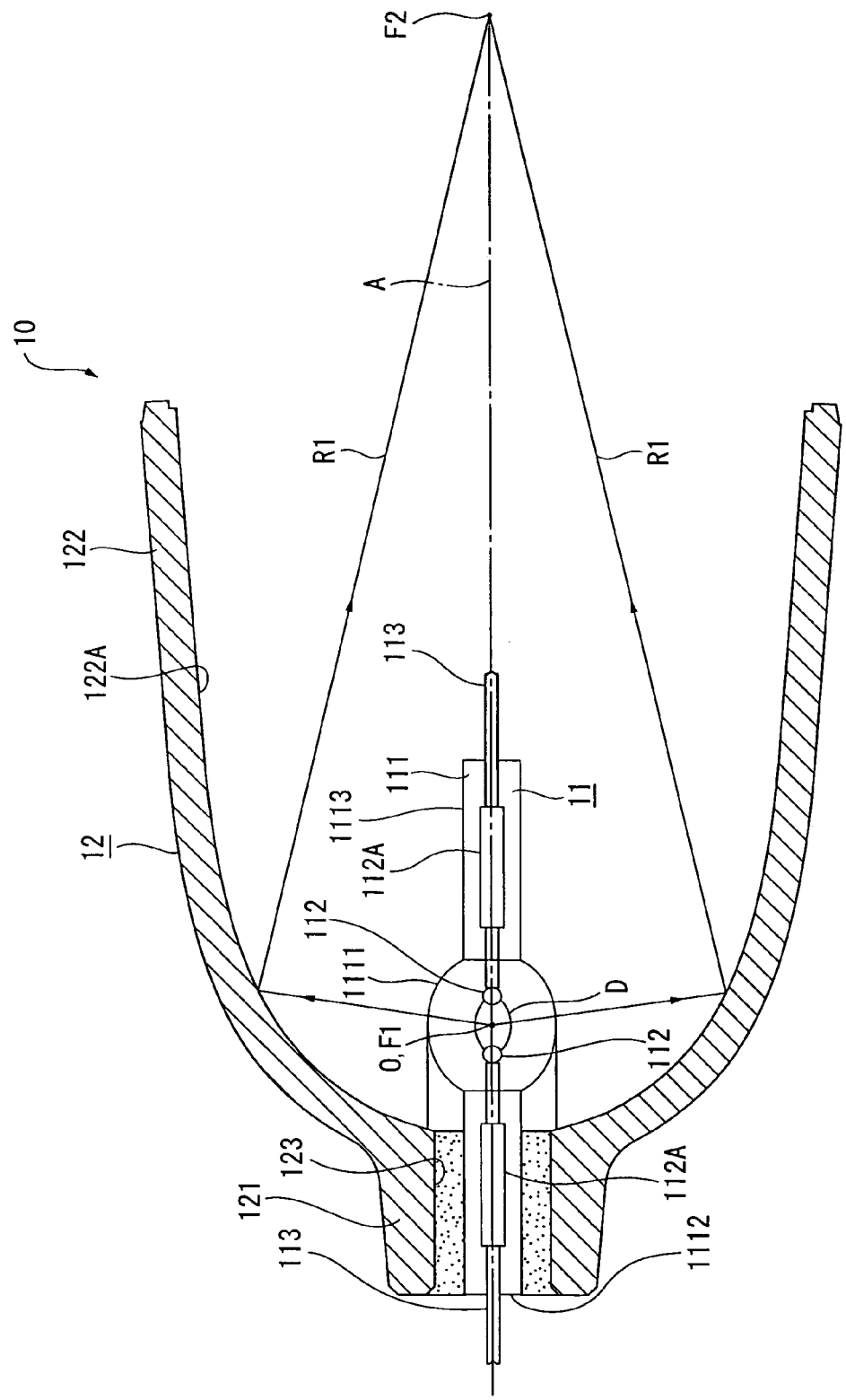
FIG. 3 is another cross section showing the outline of the light source device of the exemplary embodiment.

FIGS. 2 and 3 are cross sections each showing the outline of the light source device 10. Specifically, FIG. 2 is an illustration showing an arrangement using a parabolic reflector as the main reflecting mirror 12. FIG. 3 is an illustration showing an arrangement using an ellipsoidal reflector as the main reflecting mirror 12.

As shown in FIG. 2 or 3, the light source device 10 employs an arrangement in which the light source lamp 11 is disposed inside the main reflecting mirror 12 (reflector).

[Arrangement of Light Source Lamp]

As shown in FIG. 2 or 3, the light source lamp 11 includes an emitting tube 111 formed by a quartz glass tube, a pair of electrodes 112 disposed in the emitting tube 111 and a sealing material (not shown).

As the light source lamp 11, variety of light source lamps emitting with high intensity can be employed, e.g. metal halide lamp, high-pressure mercury lamp, super high-pressure mercury lamp.

The emitting tube 111 includes an emitting portion 1111 positioned at the center and bulged substantially spherically, and a pair of sealing portions 1112 and 1113 extending from both sides of the emitting portion 1111.

A substantially spherical discharge space is formed in the emitting portion 1111, and a pair of electrodes 112, mercury, rare gas and a small quantity of halogen are sealed in the discharge space.

Inserted into the pair of sealing portions 1112 and 1113 are metal foils 112A made of molybdenum and electrically connected to the pair of the electrodes 112, the metal foils 112A sealed with a glass material or the like. A lead wire 113 (electrode-connecting wire) is connected to each of the metal foils 112A, the lead wire 113 extending toward the outside of the light source lamp 11.

As shown in FIG. 2 or 3, when voltage is applied to the lead wire 113, difference in potential is generated between the electrodes 112 via the metal foils 112A, and the arc image D is generated to cause the inside of the emitting portion 1111 to emit. Incidentally, the emitting center will be referred to as a center position O of the arc image D generated between the electrodes 112 in the following description. The center position O of the arc image D is positioned substantially at the center of the pair of electrodes 112. Further, the center position O of the arc image D substantially coincides with an intersection of a central axis (corresponding to the illumination optical axis A in FIGS. 2 and 3) of the emitting tube 111 extending along the extending direction of the sealing portions 1112 and 1113 and a cross section along a plane orthogonal to the illumination optical axis A of a portion bulging most greatly in the emitting portion 1111.

Figure 4:
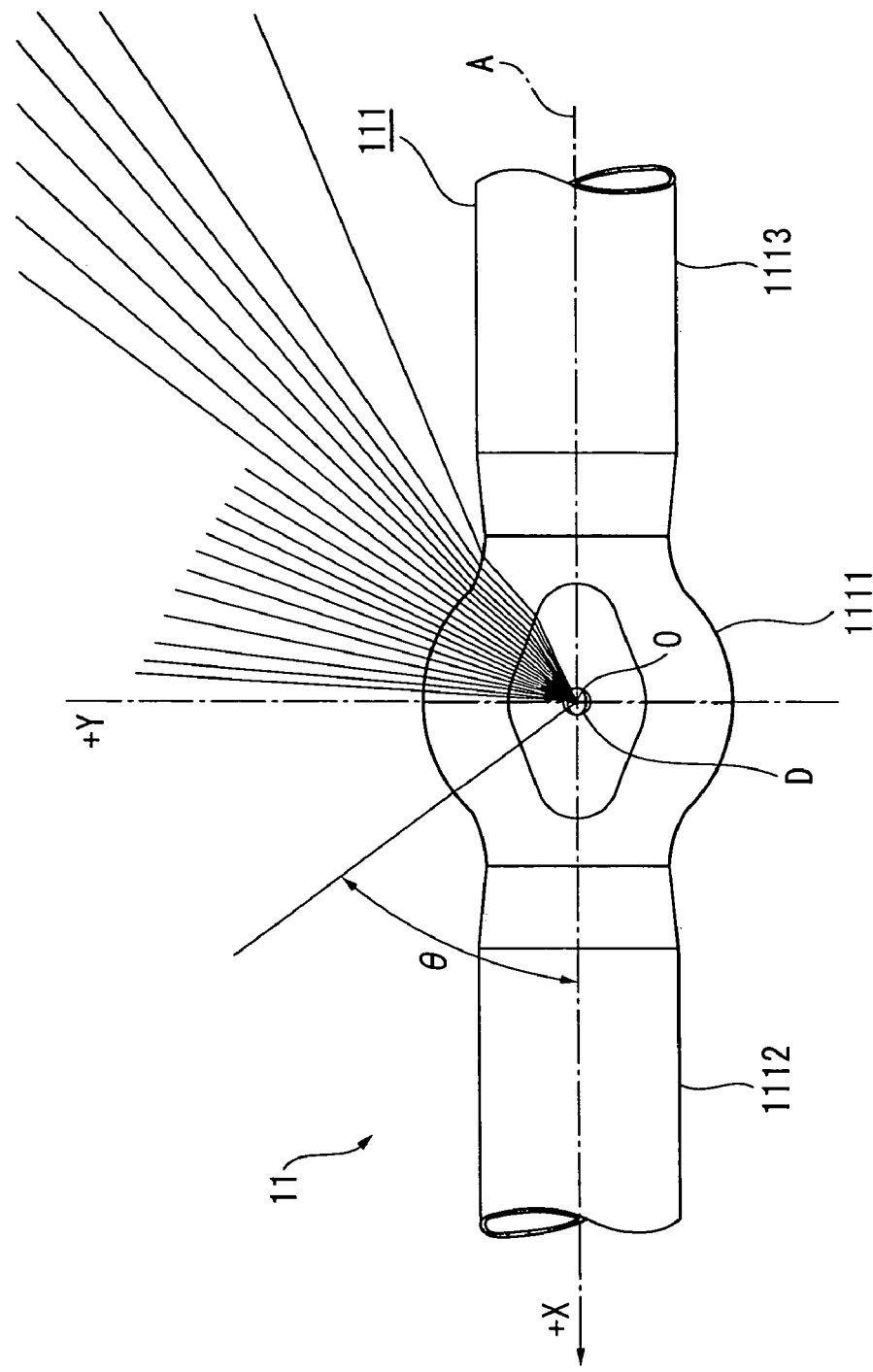
FIG. 4 is an illustration showing trajectories of light beam irradiated from a center position of an arc image of a light source lamp of the exemplary embodiment.

FIG. 4 is an illustration showing trajectories of the light beam irradiated from the center position O of the arc image D of the light source lamp 11. In FIG. 4, the illumination optical axis A is X-axis, while an axis passing through the center position O of the arc image D and orthogonal to the X-axis is Y-axis for convenience of explanation. Further, on X-axis of FIG. 4, a leftward direction is a +X direction, while a rightward direction is −X direction. An angle from the X-axis in the +X direction is angle θ. Although only the light beam with angle θ of 90°-180° are shown, light beam with angle θ of 0°-90°, 180°-270°, and 270°-360° are almost the same as the light beam with angle θ of 90°-180°.

Figure 5:
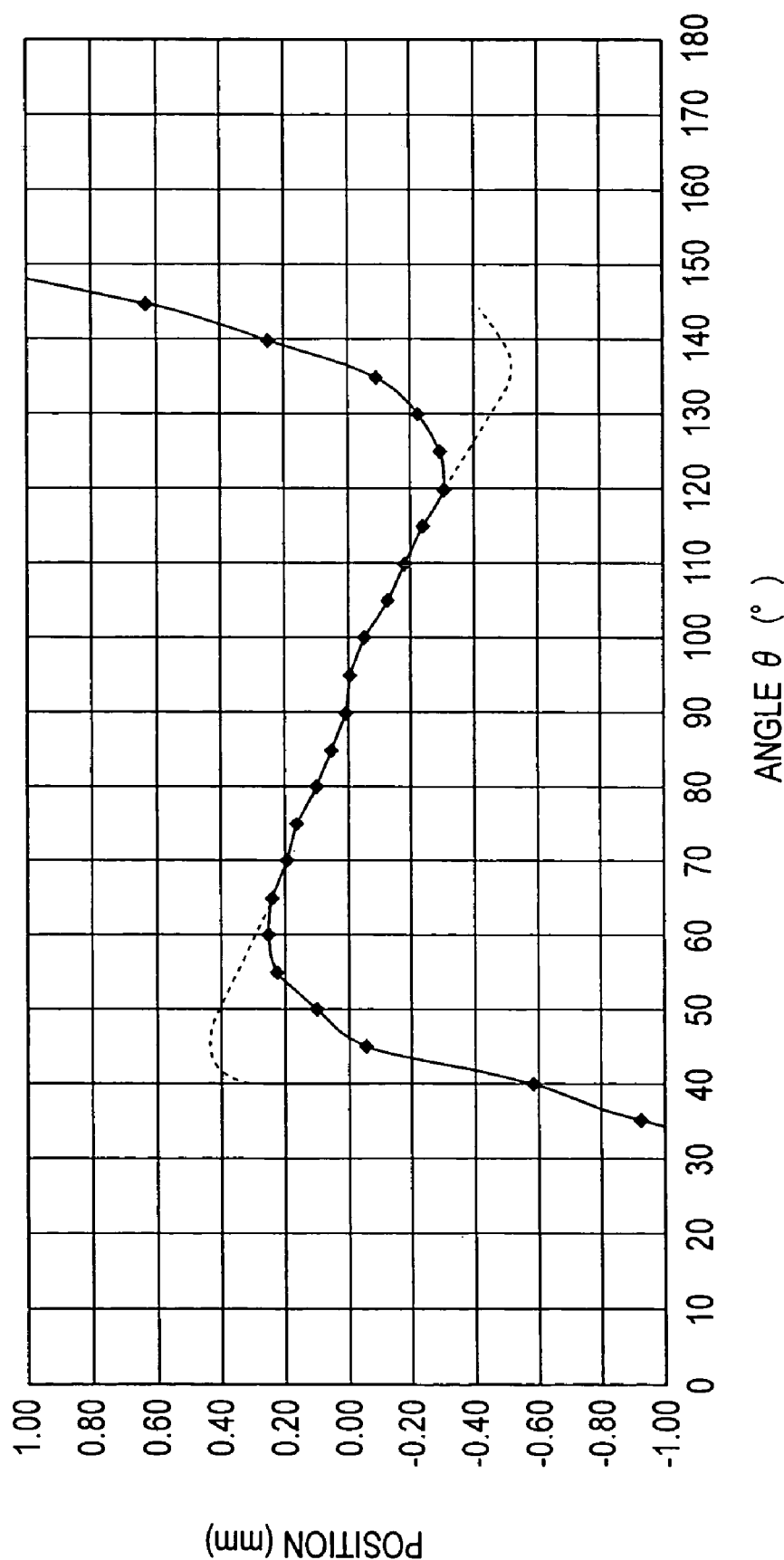
FIG. 5 is a chart showing an example of how the center position of the arc image apparently moves on an X-axis of FIG. 4 due to refraction effect of an emitting tube when an emitting portion is seen from angle θ with the angle θ being changed gradually.

FIG. 5 is a chart showing an example of how the center position O of the arc image D apparently moves on the X-axis of FIG. 4 due to the refraction effect of the emitting tube 111 when the emitting portion 1111 is seen from angle with the angle θ in FIG. 4 being gradually changed. Specifically, in FIG. 5, angle θ shown in FIG. 4 is changed by 5°, and an apparent position of the center position O of the arc image D is plotted for each angle θ. Incidentally, in FIG. 5, the horizontal axis shows angle θ in FIG. 4, while the vertical axis shows the apparent position of the center position O of the arc image D on the X-axis in FIG. 4.

Since the emitting tube 111 includes the emitting portion 1111 bulged as described above, there exist curved surfaces connecting the outer circumferential surface of the emitting portion 1111 and the outer circumferential surfaces of the sealing portions 1112 and 1113 in the vicinity of boundaries of the emitting portion 1111 and the sealing portions 1112 and 1113. In the curved surfaces connecting the outer circumferential surface of the emitting portion 1111 and the outer circumferential surfaces of the sealing portions 1112 and 1113, there exist positions changing a refraction direction in which the light beam irradiated from the center position O of the arc image D and passing through the emitting tube 111 is refracted when the light beam is irradiated from the outer circumferential surface of the emitting portion 1111. Incidentally, in the following description, the positions will be referred to as inflection points.

Specifically, in FIG. 4, when angle θ is 90°, since the refraction effect is not generated on the emitting tube 111, the apparent position of the center position O of the arc image D does not move from the real center position O of the arc image D as shown in FIG. 5.

In FIG. 4, when angle θ is increased to be greater than 90°, the apparent position moves relative to the real center position O of the arc image D as shown below.

When angle θ is increased to be greater than 90°, since the refraction effect is generated on the emitting tube 111, the apparent position of the center position O of the arc image D moves in −X direction in FIG. 4 at substantially constant rate, as shown in FIG. 5.

As shown in FIG. 5, when angle θ becomes greater than around 120°, the apparent position of the center position O of the arc image D moves reversely, namely, in +X direction in FIG. 4.

On the other hand, in FIG. 4, when angle θ is decreased to be smaller than 90°, the apparent position of the center position O of the arc image D moves as shown below, in a manner substantially same as described above.

As shown in FIG. 5, when angle θ is decreased to be smaller than 90°, since the refraction effect is generated on the emitting tube 111, the apparent position of the center position O of the arc image D moves in +X direction in FIG. 4 at substantially constant rate, as shown in FIG. 5.

When angle θ becomes smaller than around 60°, the apparent position of the center position O of the arc image D moves reversely, namely, in −X direction in FIG. 4.

Following is an explanation for a phenomenon in which the moving direction of the apparent position of the center position O of the arc image D changes at angle θ around 120° and 60° in the two cases described above.

When angle θ is in the range from 90° to around 120°, since the apparent position of the center position O of the arc image D moves in −X direction, the light beam irradiated from the center position O of the arc image D passes through the emitting tube 111 to be refracted in a direction orthogonal to the X-axis on the outer circumferential surface of the emitting portion 1111.

Similarly, when angle θ is in the range from around 60° to 90°, since the apparent position of the center position O of the arc image D moves in +X direction, the light beam irradiated from the center position O of the arc image D passes through the emitting tube 111 to be refracted in a direction orthogonal to the X-axis on the outer circumferential surface of the emitting portion 1111.

In the following description, the light beam irradiated from the center position O of the arc image D and passing through the emitting tube 111 to be refracted in a direction orthogonal to the X-axis on the outer circumferential surface of the emitting portion 1111 will be referred to as a first beam for convenience of explanation.

In the example shown in FIG. 5, when angle θ is in the range from around 60° to around 120°, the light beam irradiated from the center position O of the arc image D is irradiated as the first beam from the outer circumferential surface of the emitting portion 1111.

On the other hand, when angle θ is in the range greater than around 120°, since the apparent position of the center position O of the arc image D moves in +X direction, the light beam irradiated from the center position O of the arc image D passes through the emitting tube 111 to be refracted in a direction toward the X-axis on the outer circumferential surface of the emitting portion 1111.

Similarly, when angle θ is in the range smaller than around 60°, since the apparent position of the center position O of the arc image D moves in −X direction, the light beam irradiated from the center position O of the arc image D passes through the emitting tube 111 to be refracted in a direction toward the X-axis on the outer circumferential surface of the emitting portion 1111.

In the following description, the light beam irradiated from the center position O of the arc image D and passing through the emitting tube 111 to be refracted in a direction toward the X-axis on the outer circumferential surface of the emitting portion 1111 will be referred to as a second beam for convenience of explanation.

In the example shown in FIG. 5, when angle θ is in the ranges greater than around 120° and smaller than around 60°, the light beam irradiated from the center position O of the arc image D is irradiated as the second beam from the outer circumferential surface of the emitting portion 1111.

Thus, in the example shown in FIG. 5, there are boundaries at angles θ around 60° and around 120°, where the refraction direction of the light beam (first beam and second beam) irradiated from the outer circumferential surface of the emitting portion 1111 changes, the boundaries corresponding to the above-described inflection points. That is to say, on the outer circumferential surface of the emitting portion 1111, the light beam irradiated from the emitting portion 1111 side becomes the first beam, while the light beam irradiated from the sealing portions 1112 and 1113 sides becomes the second beam with the inflection points as boundaries.

The emitting tube 111 in the present exemplary embodiment is manufactured by a manufacturing method described below to form the inflection points satisfying relations described later.

Figure 6A:
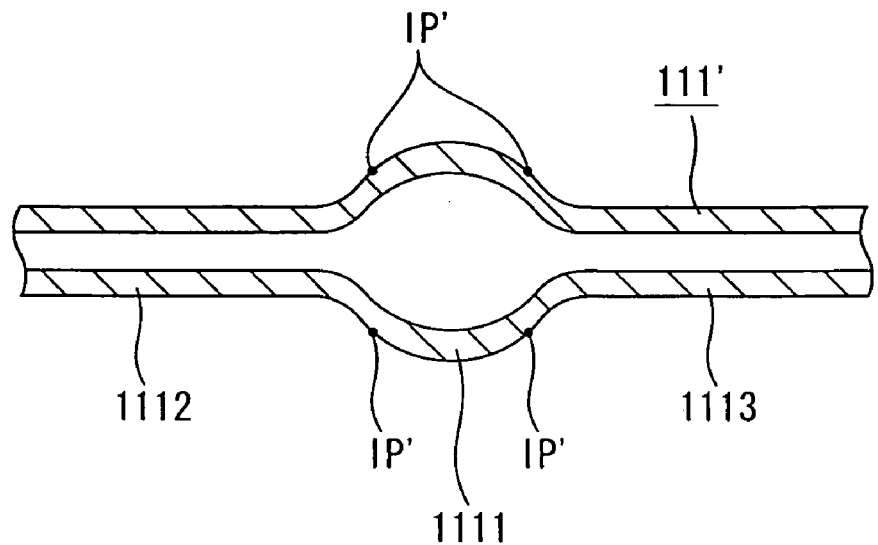
FIGS. 6A and 6B are illustrations each showing a manufacturing method of the emitting tube of the exemplary embodiment.
Figure 6B:
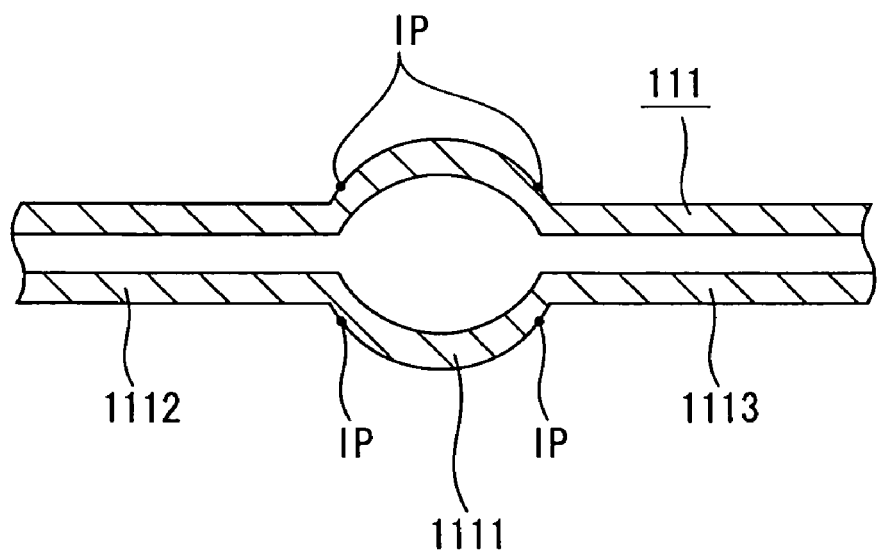

FIGS. 6A and 6B are illustrations each showing manufacturing method of the emitting tube 111.

First, a quartz glass tube is heat-softened on a predetermined position which is to be the emitting portion. Next, a die (not shown) that defines a shape of the emitting portion is applied to the predetermined portion from the outer circumferential surface of the quartz glass tube, and the predetermined position is inflated by sending air into the quartz glass tube. The air is sent until the outer circumferential surface of the inflated quartz glass tube touches the inner circumferential surface of the die. Then, the predetermined position is hardened by cooling. With the processes described above, namely by blow-molding, a base tube 111' of the emitting tube 111 is formed as shown in FIG. 6A.

By grinding or polishing near the boundaries between the emitting portion 1111 and the sealing portions 1112 and 1113 of the base tube 111', positions of inflection points IP' (FIG. 6A) of the emitting portion 1111 as the base tube 111' are moved in a direction toward the sealing portions 1112 and 1113 to form inflection points IP (FIG. 6B). By machining the base tube 111' as described above, the emitting tube 111 is manufactured.

In manufacturing the emitting tube 111, an anti-reflection coating such as tantalum oxide film, hafnium oxide film and titanium oxide film may be provided to the outer circumferential surface of the emitting portion 1111 for reducing the light loss caused by reflection of the light passing through the emitting portion 1111.

Incidentally, in FIG. 5, the solid line shows how the apparent position of the center position O of the arc image D moves when using the base tube 111' with the inflection points IP', while the dashed line shows how the apparent position of the center position O of the arc image D moves when using the emitting tube 111 with the inflection points IP formed by machining as described above.

By shifting the inflection points IP' to the inflection points IP, in other words, by moving the positions of the inflection points in a direction toward the sealing portions 1112 and 1113, changing positions of the moving direction of the apparent position of the center position O of the arc image D in accordance with angle θ are also moved from around 60° and around 120° to around 45° that is smaller than around 60° and to around 135° that is greater than around 120°.

Figure 7:
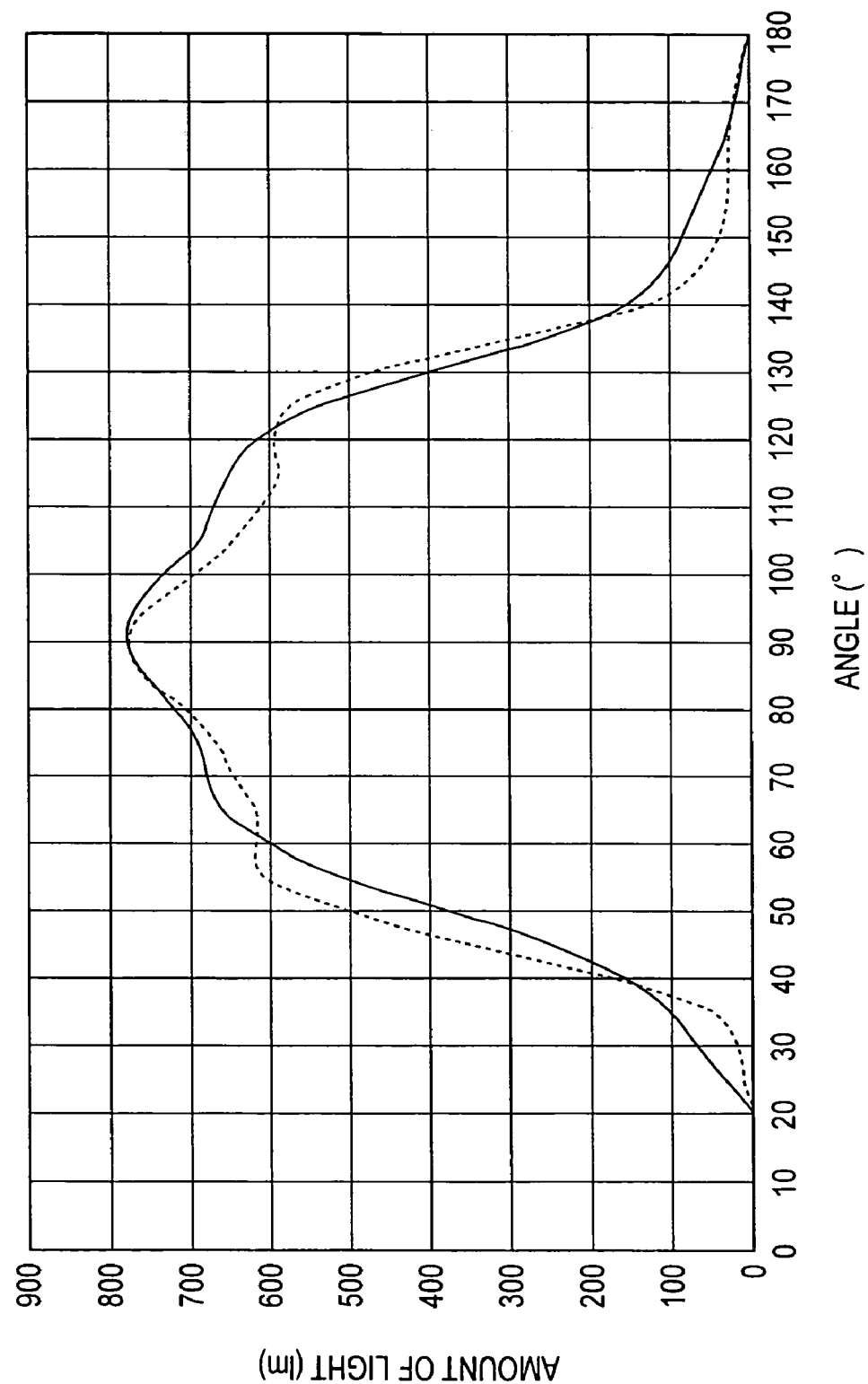
FIG. 7 is a chart showing an example of how amount of the light beam irradiated from the light source lamp changes by changing positions of inflection points.

FIG. 7 is a chart showing how amount of the light beam irradiated from the light source lamp 11 changes by changing positions of inflection points. Specifically, after illuminance of the light beam irradiated from the light source lamp 11 in a direction of angle θ shown in FIG. 4 is measured, the measured illuminance is converted to amount of the light, and then, the converted amount of the light is plotted in FIG. 7 in accordance with angle θ. In FIG. 7, the horizontal axis shows angle θ in FIG. 4, while the vertical axis shows the converted amount of the light. Note that, in FIG. 7, the solid line is obtained by plotting amount of the light beam irradiated from the light source lamp 11 in accordance with angle θ when using the base tube 111' with the inflection points IP', while the dashed line is obtained by plotting amount of the light beam irradiated from the light source lamp 11 in accordance with angle θ when using the emitting tube 111 with the inflection points IP formed by machining the base tube 111'.

By shifting the inflection points IP' to the inflection points IP, in other words, by moving the inflection points in a direction toward the sealing portions 1112 and 1113, amount of the light beam irradiated with small angle θ of around 20°-40° and around 140°-165° toward the X-axis (FIG. 4) is reduced, in the example shown in FIG. 7. The amount of the light of the light beam irradiated with the angle higher than the small angle θ around 20°-40° and around 140°-165° is increased.

Following is an explanation for a phenomenon in which amount of the light beam irradiated with small angle is reduced, and amount of the light beam irradiated with the angle higher than the small angle is increased by moving the positions of the inflection points in a direction toward the sealing portions 1112 and 1113 as described above.

By moving positions of the inflection points in a direction toward the sealing portions 1112 and 1113, the boundaries changing the refraction direction in which the light is refracted on the outer circumferential surface of the emitting portion 1111 is moved in a direction toward the sealing portions 1112 and 1113. Thus, an irradiation range of the first beam that is refracted in a direction orthogonal to X-axis (FIG. 4) on the outer circumferential surface of the emitting portion 1111 is widened, while an irradiation range of the second beam that is refracted in a direction toward X-axis (FIG. 4) on the outer circumferential surface of the emitting portion 1111 is narrowed. Therefore, amount of the light beam irradiated with small angle in a direction toward X-axis (FIG. 4) is reduced with the irradiation range of the second beam being narrowed, while the amount of the light beam irradiated with an angle greater than the small angle is increased with the irradiation range of the first beam being widened.

[Arrangement of Main Reflecting Mirror]

As shown in FIG. 2 or 3, the main reflecting mirror 12 is a transmissive integral molding made of glass, which includes a cylindrical neck 121 to which the sealing portion 1112 on a base end side of the light source lamp 11 is inserted, and a reflecting portion 122 formed in a concave curved surface and extending from the neck 121.

As shown in FIG. 2 or 3, the neck 121 is substantially cylindrical having an insertion hole 123 molded at the center thereof, and the sealing portion 1112 is inserted into the center of the insertion hole 123.

The reflecting portion 122 has a reflecting surface 122A that is formed by depositing the metal thin film on a glass surface shaped like a rotation curve. The reflecting surface 122A is a cold mirror that reflects a visual ray and transmits an infrared ray and an ultraviolet ray.

When a parabolic reflector is employed as the main reflecting mirror 12, F1 shown in FIG. 2 denotes a focus position of the rotation curve of the reflecting surface 122A of the main reflecting mirror 12.

The light source lamp 11 disposed in the reflecting portion 122 of the main reflecting mirror 12 is so disposed that the center position O of the arc image D is positioned near the focus position F1 of the rotation curve of the reflection surface 122A of the reflection portion 122.

When the light source lamp 11 is turned on, a light beam R1 irradiated from the emitting portion 1111 and traveling toward the main reflecting mirror 12 reflects on the reflecting surface 122A of the reflecting portion 122 of the main reflecting mirror 12 as shown in FIG. 2 to be a parallel light that is parallel to the illumination optical axis A.

Figure 8:
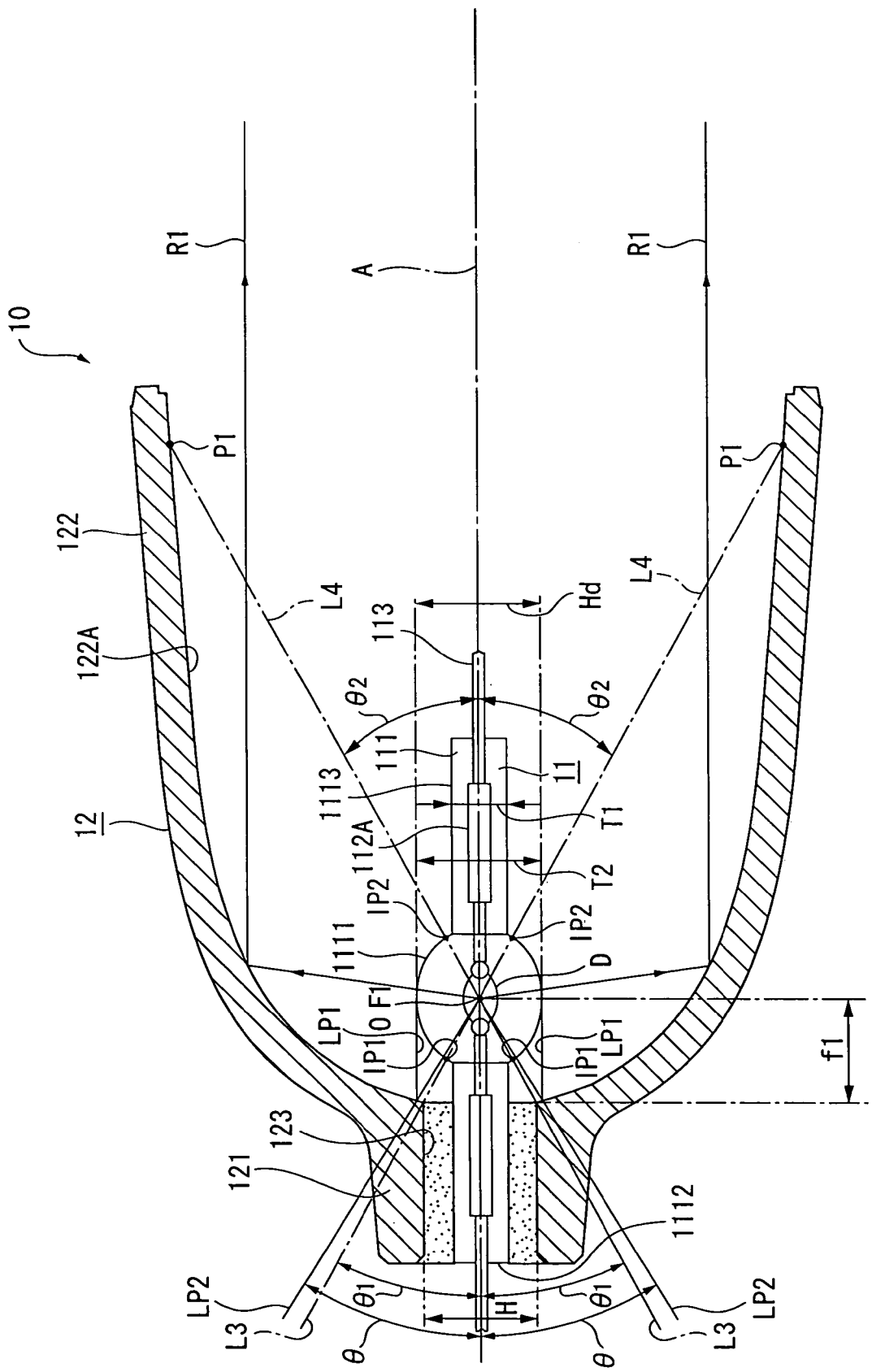
FIG. 8 is an illustration showing a usable-light reflection area and unusable-light reflection areas in the exemplary embodiment.

FIG. 8 is an illustration showing a usable-light reflection area and unusable-light reflection areas in a case where the parabolic reflector is employed as the main reflecting mirror 12.

In the main reflecting mirror 12 described above, in the light beam irradiated from the emitting portion 1111 toward the main reflecting mirror 12, there exist a usable-light reflection area where the light beam can be used as an illumination light, and unusable-light reflection areas where the light beam cannot be used as an illumination light.

In the reflection areas, there are two unusable-reflection areas defined as described below. Incidentally, the usable-light reflection area of the main reflecting mirror 12 corresponds to an area excluding the two unusable-light reflection areas described below in the reflecting portion 122.

First, a first unusable-light reflection area is an insertion hole 123 of the neck 121 of the main reflecting mirror 12 as shown in FIG. 8. That is to say, the light beam irradiated from the emitting portion 1111 and traveling toward the insertion hole 123 of the neck 121 is not reflected by the reflecting surface 122A of the main reflecting mirror 12 and thus not used as the illumination light.

A second unusable-light reflection area is an area where the light beam is shielded by the emitting tube 111 even when the light beam is reflected by the reflecting surface 122A of the main reflecting mirror 12.

In FIG. 8, in the main reflecting mirror 12 formed by the parabolic reflector, an area positioned within a cylindrical area enclosed by lines LP1 passing through the most-bulged portions of the emitting portion 1111 of the emitting tube 111 of the light source lamp 11 and parallel to the illumination optical axis A is the second unusable-light reflection area. As shown in FIG. 8, an intersecting position of the cylindrical area defining the second unusable-light reflection area of the main reflecting mirror 12 formed by the parabolic reflector and the reflecting surface 122A is a circle having diameter Hd defining a edge on the neck 121 side of the usable-light reflection area of the main reflecting mirror 12. When the main reflecting mirror 12 is formed by the parabolic mirror, the diameter Hd is equal to outer diameter T2 at the most-bulged portions of the emitting portion 1111. When the distance in a direction of the illumination optical axis A between the center position O of the arc image D and the edge on the neck 121 side of the usable-light reflection area of the main reflecting mirror 12 is f1, angle θ formed by lines LP2 connecting the center position O of the arc image D with the edge on the neck 121 side of the usable-light reflection area of the main reflecting mirror 12 and the illumination optical axis A can be defined by Formula 20 (shown below).

$$\theta=\mathrm{Tan}^{-1}(Hd/(2f1)) \qquad \text{[Formula 20]}$$

As shown in FIG. 3, when the main reflecting mirror 12 is formed by the ellipsoidal reflector, F1 and F2 denote a first focus position and a second focus position of the rotation curve of the reflecting surface 122A of the main reflecting mirror 12.

The light source lamp 11 disposed in the reflecting portion 122 of the main reflecting mirror 12 is so disposed that the center position O of the arc image D is positioned near the first focus position F1 of the rotation curve of the reflecting surface 122A of the reflecting portion 122.

Figure 9:
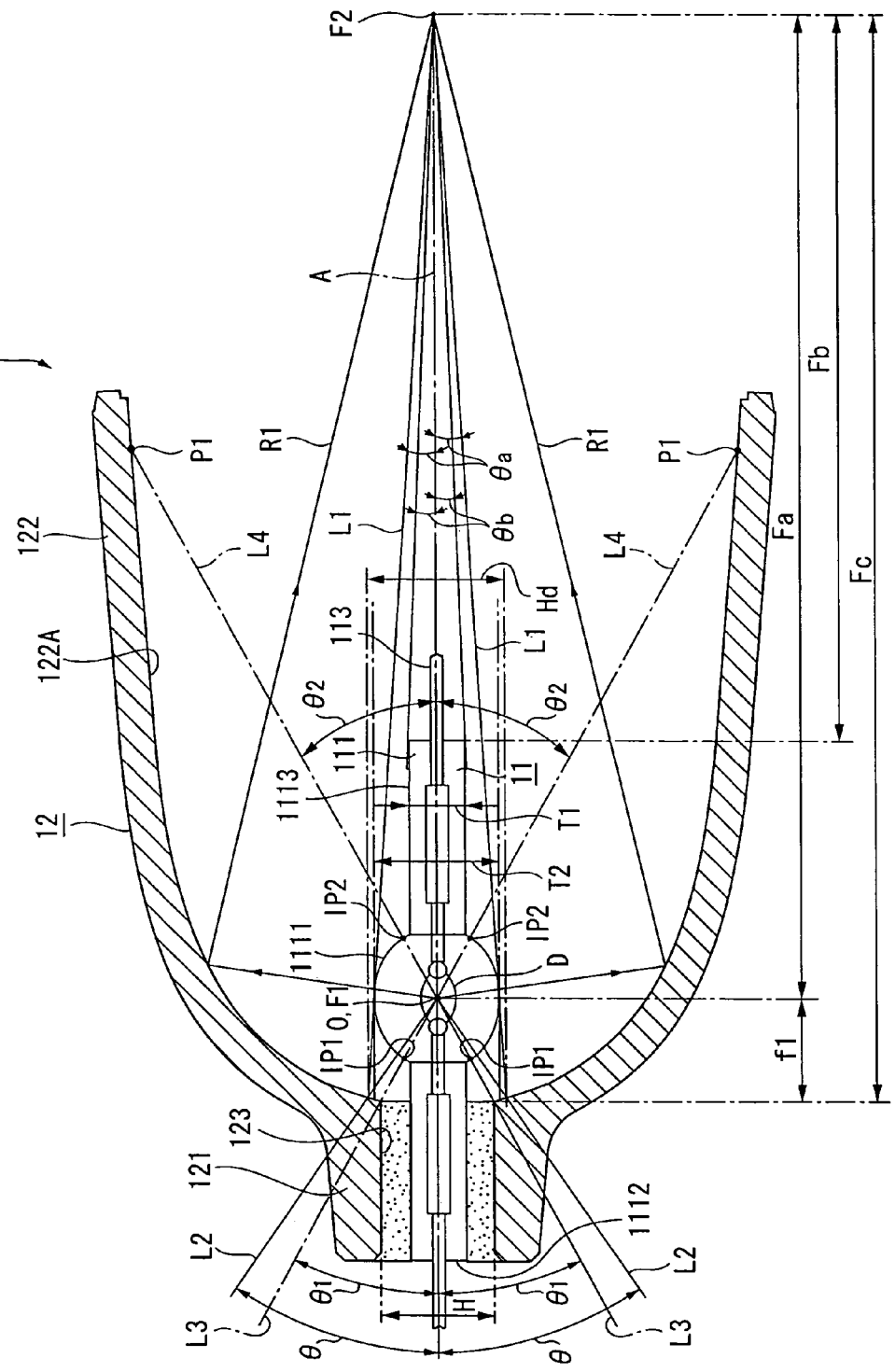
FIG. 9 is another illustration showing the usable-light reflection area and the unusable-light reflection area in the exemplary embodiment.

As shown in FIG. 9, when the light source lamp 11 is turned on, a light beam R1 irradiated from the emitting portion 1111 and traveling toward the main reflection mirror 12 reflects on the reflecting surface 122A of the reflecting portion 122 of the main reflecting mirror 12 to be a convergent light beam that is converged on the second focus position F2 of the rotation curve.

FIG. 9 is an illustration showing a usable-light reflection area and unusable-light reflection areas in a case where the ellipsoidal reflector is employed as the main reflecting mirror 12.

When the main reflecting mirror 12 is formed by the ellipsoidal reflector, in the light beam irradiated from the emitting portion 1111 toward the main reflecting mirror 12, there exist in the main reflecting mirror 12 a usable-light reflection area for reflecting the light beam that is usable as an illumination light and unusable-light reflection areas for reflecting the light beam that is not usable as an illumination light.

In the reflection areas, there are two unusable-reflection areas defined as described below.

First, a first unusable-light reflection area is an insertion hole 123 of the neck 121 of the main reflecting mirror 12 as shown in FIG. 9. That is to say, the light beam irradiated from the emitting portion 1111 and traveling toward the insertion hole 123 of the neck 121 is not reflected by the reflecting surface 122A of the main reflecting mirror 12 and thus not used as the illumination light.

Since the main reflecting mirror 12 as the ellipsoidal reflector converges the light beam reflected by the reflecting surface 122A on the second focus position F2, a second unusable-light reflection area of the main reflecting mirror 12 is positioned within a conical area enclosed by lines L1 connecting the most-bulged portions of the emitting portion 1111 of the emitting tube 111 or an end of the sealing portion 1113 with the second focus position F2, as shown in FIG. 9. As shown in FIG. 9, the lines L1 is inclined relative to the illumination optical axis A.

Thus, as shown in FIG. 9, the second unusable-light reflection area, where the light beam is shielded by the emitting tube 111 even when the light beam is reflected by the main reflecting mirror 12 as the ellipsoidal reflector, is positioned within the conical area enclosed by lines connecting the most-bulged portions of the emitting portion 1111 of the emitting tube 111 or the end of the sealing portion 1113 positioned away from the main reflecting mirror 12 with the second focus position F2.

As shown in FIG. 9, the conical area enclosed by the lines L1 connecting the most-bulged portion of the emitting portion 1111 with the second focus position F2 is, when the outer diameter at the most-bulged portion of the emitting portion 1111 of the emitting tube 111 is T2, and the distance between the second focus position F2 of the main reflecting mirror 12 and the most-bulged portions of the emitting portion 1111 in the central axis direction (i.e. a direction of the illumination optical axis A) of the light beam irradiated from the light source device 10 is Fa, a conical area in which the lines L1 connecting the most-bulged portions of the emitting portion 1111 of the emitting tube 111 with the second focus position F2 have angle θa defined by Formula 21 (shown below) relative to the illumination optical axis A.

$$\theta a=\mathrm{Tan}^{-1}(T2/(2Fa)) \qquad \text{[Formula 21]}$$

The conical area enclosed by the lines connecting the end of the sealing portion 1113 on the side away from the main reflecting mirror 12 with the second focus position F2 is, when the outer diameter of the sealing portion 1113 on the side away from the main reflecting mirror 12 is T1, and the distance in a direction of the illumination optical axis A between the second focus position F2 of the main reflecting mirror 12 and the end of the sealing portion 1113 is Fb, a conical area in which the lines connecting the end of the sealing portion 1113 with the second focus position F2 have angle θb defined by Formula 22 (shown below) relative to the illumination optical axis A.

$$\theta b=\mathrm{Tan}^{-1}(T1/(2Fb)) \qquad \text{[Formula 22]}$$

Therefore, as shown in FIG. 9, the second unusable-light reflection area of the main reflecting mirror 12 as the ellipsoidal reflector is positioned within the conical area enclosed by the lines having greater angle of angle θa defined by Formula 21 and angle θb defined by Formula 22, and the diameter Hd of the circle defining the edge on the neck 121 side of the usable-light reflection area of the reflecting surface 122A of the main reflecting mirror 12 is the diameter of the circle defining the intersecting position of the reflecting portion and the conical area enclosed by the lines having greater angle of angle θa defined in Formula 21 and angle θb defined in Formula 22.

In other words, when the distance in the direction of the illumination optical axis A between the edge on the neck 121 side of the usable-light reflection area of the reflecting surface 122A of the main reflecting mirror 12 and the second focus position F2 is Fc under the condition of angle θa>angle θb, the diameter Hd of the circle defining the edge on the neck 121 side of the usable-light reflection area of the reflecting surface 122A of the main reflecting mirror 12 is a length defined by Formula 23 (shown below).

$$Hd = (Fc \cdot \text{Tan } \theta a) \cdot 2 \quad \text{[Formula 23]}$$

On the other hand, when a distance in the direction of the illumination optical axis A between the edge on the neck 121 side of the usable-light reflection area of the reflecting surface 122A of the main reflecting mirror 12 and the second focus position F2 is Fc under the condition of angle θa<angle θb, the diameter Hd of the circle defining the edge on the neck 121 side of the usable-light reflection area of the reflecting surface 122A of the main reflecting mirror 12 is a length defined by Formula 24 (shown below).

$$Hd = (Fc \cdot \text{Tan } \theta b) \cdot 2 \quad \text{[Formula 24]}$$

In the light source device 10 shown in FIG. 9, since angle θa formed by the lines connecting the most-bulged portions of the emitting portion 1111 of the emitting tube 111 with the second focus position F2 and the illumination optical axis A is greater than angle θb formed by the lines connecting the end of the sealing portion 1113 with the second focus position F2 and the illumination optical axis A, the conical area defining the second unusable-light reflection area of the main reflecting mirror 12 is defined by lines connecting the most-bulged portions of the emitting portion 1111 of the emitting tube 111 with the second focus position F2. The intersecting position of the conical area defining the second unusable-light reflection area of the main reflecting mirror 12 and the reflecting surface 122A is the circle having diameter Hd defining the edge on the neck 121 side of the usable-light reflection area of the main reflecting mirror 12. When the distance in the direction of the illumination optical axis A between the center position O of the arc image D and the edge on the neck 121 side of the usable-light reflection area of the main reflecting mirror 12 is f1, angle θ formed by lines L2 connecting the center position O of the arc image D with the edge on the neck 121 side of the usable-light reflection area of the main reflecting mirror 12 and the illumination optical axis A can be defined by Formula 25 (shown below).

$$\theta = \text{Tan}^{-1}(Hd/(2f1)) \quad \text{[Formula 25]}$$

In the present exemplary embodiment, as shown in FIG. 8 or 9, when the angle formed by lines L3 connecting inflection points IP1 on the main reflecting mirror 12 side of the emitting tube 111 with the center position O of the arc image D and the illumination optical axis A is θ1, the emitting tube 111 is manufactured by the above-described manufacturing method of the emitting tube 111 so as to satisfy relation of Formula 26 (shown below).

$$\theta 1 \leq \text{Tan}^{-1}(Hd/(2f1)) \quad \text{[Formula 26]}$$

In the present exemplary embodiment, as shown in FIG. 8 or 9, when the smallest angle formed by lines L4 connecting the inflection points IP2 on the sealing portion 1113 side of the emitting tube 111 with the center position O of the arc image D and the illumination optical axis A is θ2, the emitting tube 111 manufactured by the above-described manufacturing method of the emitting tube 111 so that angle θ1 and angle θ2 become equal.

In the present exemplary embodiment, as shown in FIG. 8 or 9, when the diameter of the sealing portions 1112 and 1113 is T1, and the diameter of the insertion hole 123 of the main reflecting mirror 12 is H, the main reflecting mirror 12 is so manufactured as to satisfy relation of Formula 27 (shown below).

$$T1 < H \leq Hd \quad \text{[Formula 27]}$$

In the present exemplary embodiment, as shown in FIG. 8 or 9, the main reflecting mirror 12 described above is so manufactured that an opening end on an illumination light-irradiation side of the reflecting portion 122 of the main reflecting mirror 12 extends toward the upstream (frontward) relative to an intersecting point P1 of the reflecting portion 122 and the lines L4 connecting the inflection points IP2 on the sealing portion 1113 side of the emitting tube 111 with the center position O of the arc image D.

In the first exemplary embodiment described above, since the diameter H of the insertion hole 123 of the main reflecting mirror 12 is set to be equal to or smaller than the diameter Hd of the circle defining the edge on the neck 121 side of the usable-light reflection area of the main reflecting mirror 12, the insertion hole 123, i.e., the first unusable-light reflection area can be securely positioned within the second unusable-light reflection area, so that the unusable-light reflection area of the main reflecting mirror 12 can be defined only to the second unusable-light reflection area. Therefore, by setting the insertion hole 123 as shown in Formula 27, the unusable-light reflection area is not unnecessarily enlarged, which allows effective utilization of the light beam irradiated from the center position O of the arc image D.

By setting the diameter H of the insertion hole 123 to be greater than the diameter T1 of the sealing portions 1112 and 1113 as shown in Formula 27, the sealing portion 1112 can be inserted into the insertion hole 123, so that the light source lamp 11 can be properly supported by the neck 121.

By disposing the light source lamp 11 so that the center position O of the arc image D is positioned on the first focus position F1 of the main reflecting mirror 12 and by setting angle θ1 formed by the lines L3 and the illumination optical axis A as shown in Formula 26 (shown above), the inflection points IP1 between the emitting portion 1111 and the sealing portion 1112 on the main reflecting mirror 12 side are positioned so that the light beam irradiated from the center position O of the arc image D toward the usable-light reflection area of the main reflecting mirror 12 and having the smallest angle relative to the illumination optical axis A under the condition where the refraction on the outer circumferential surface of the emitting portion 1111 is not considered can be irradiated from the emitting portion as the first beam.

Incidentally, in a case where θ1 is set to be out of the range of Formula 26, for instance, when θ1 is greater than Tan$^{-1}$(Hd/(2f1)), the inflection points IP1 are positioned so that the lines L3 connecting the inflection points IP1 between the emitting portion 1111 and the sealing portion 1112 on the main reflecting mirror 12 side with the center position O of the arc image D are positioned out of the second unusable-light reflection area of the main reflecting mirror 12 described above, namely within the usable-light reflection area. By positioning the inflection points IP1 as described above, a part of the light beam irradiated from the center position O of the arc image D and traveling toward the usable-light reflection area of the main reflecting mirror 12 under the condition where the refraction on the outer circumferential surface of the emitting portion 1111 is not considered is refracted on the outer circumferential surface of the emitting portion 1111 via the emitting tube 111 to be the second beam, which travels toward the second unusable-light reflection area of the main reflecting mirror 12. Therefore, amount of the light beam refracted on the outer circumferential surface of the emitting portion 1111 via the emitting tube 111 to be irradiated from the emitting portion 1111 and traveling toward the usable-light reflection area of the main reflecting mirror 12 becomes small, in other words, the light utilization efficiency of the light beam irradiated from the emitting portion 1111 is lowered.

In the present exemplary embodiment, by setting θ1 to be equal to or smaller than $\tan^{-1}(Hd/2f1)$ as shown in Formula 26, the lines L3 connecting the inflection points IP1 between the emitting portion 1111 and the sealing portion 1112 on the main reflecting mirror 12 side with the center position O of the arc image D is positioned on the edge on the neck side of the usable-light reflection area of the main reflecting mirror 12 or within the unusable-light reflection area. In other words, the inflection points IP1 can be positioned so that the light beam irradiated from the center position O of the arc image D to be incident on the usable-light reflection area of the main reflecting mirror 12 with the smallest angle relative to the illumination optical axis A under the condition where the refraction on the outer circumferential surface of the emitting portion 1111 is not considered can be securely incident on the usable-light reflection area. Thus, all of the light beam irradiated from the center position O of the arc image D and traveling toward the usable-light reflection area of the main reflecting mirror 12 under the condition where the refraction on the outer circumferential surface of the emitting portion 1111 is not considered is refracted on the outer circumferential surface of the emitting portion 1111 via the emitting tube 111 to be the first beam, which securely travels toward the usable-light reflection area of the main reflecting mirror 12 without traveling toward the second unusable-light reflection area of the main reflecting mirror 12. Further, the light beam irradiated from the center position O of the arc image D and traveling toward the unusable-light reflection area of the main reflecting mirror 12 under the condition where the refraction on the outer circumferential surface of the emitting portion 1111 is not considered can also be set so that a part of the light beam refracted on the outer circumferential surface of the emitting portion 1111 via the emitting tube 111 to be the first beam travels toward the usable-light reflection area of the main reflecting mirror 12. Therefore, amount of the light beam refracted on the outer circumferential surface of the emitting portion 1111 via the emitting tube 111 to be irradiated from the emitting portion 1111 and traveling toward the usable-light reflection area of the main reflecting mirror 12 can be increased, in other words, the light utilization efficiency of the light beam irradiated from the emitting portion 1111 can be enhanced.

Since the emitting tube 111 is manufactured by performing machining such as grinding or polishing on the outer circumferential surface of the emitting portion 1111 after blow-molding the base tube 111', the positions of the inflection points of the emitting portion 1111 can be easily changed, so that the light utilization efficiency of the light beam irradiated from the emitting portion 1111 can be easily enhanced.

By machining the base tube 111' in manufacturing the emitting portion 111, a loss in improper machining or the like can be kept to be low as compared to a method for machining the light source lamp 11 as a finished product. Further, remaining stress or affected layer generated by machining the base tube 111' can be removed by heating in shielding the pair of electrodes 112, the metal foil 112A and the lead wire 113 by the sealing portions 1112 and 1113.

Further, since the projector 1 includes the light source device 10 capable of enhancing the light utilization efficiency, a projection image with proper brightness can be formed. If an arrangement where the brightness is not changed is employed, luminance of the light source device 10 can be lowered, thus saving consumption of electric power.

2 Second Exemplary Embodiment

Next, a second exemplary embodiment of the present invention will be described with reference to the attached drawings.

In the following description, the same components as those in the first exemplary embodiment are indicated by the same reference symbols or numerals for omitting or simplifying the detailed description thereof.

In the first exemplary embodiment, the light source device 10 includes the light source lamp 11 and the main reflecting mirror 12.

In the second exemplary embodiment, a light source device 10A includes a main reflecting mirror 12A having a reflecting portion with a shape different from that of the main reflecting mirror 12 described in the first exemplary embodiment and a sub-reflecting mirror 13, in addition to the light source lamp 11 described in the first exemplary embodiment. Other arrangements are the same as the first exemplary embodiment.

Figure 10:
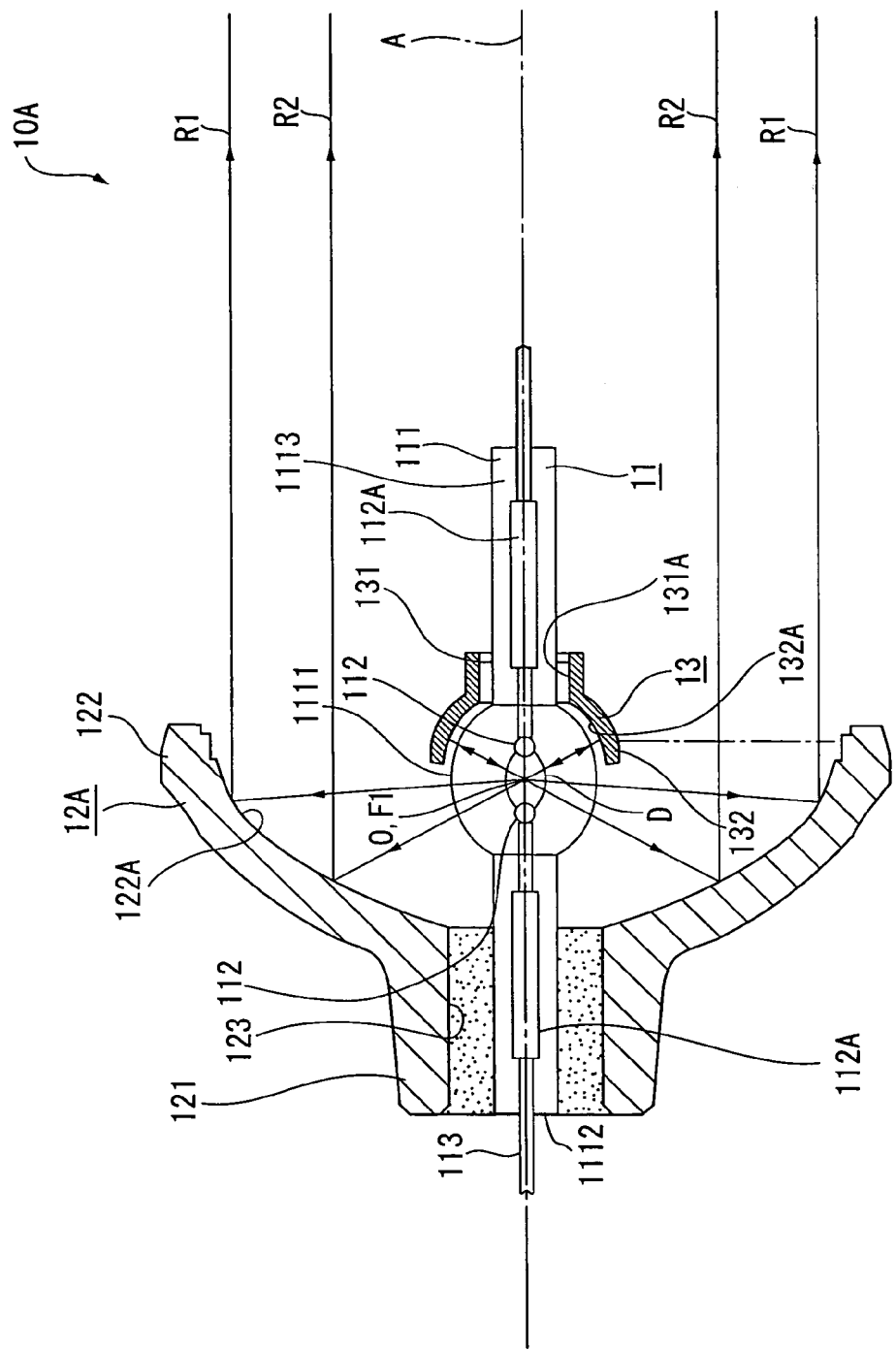
FIG. 10 is a cross section showing the outline of a light source device of a second exemplary embodiment.
Figure 11:
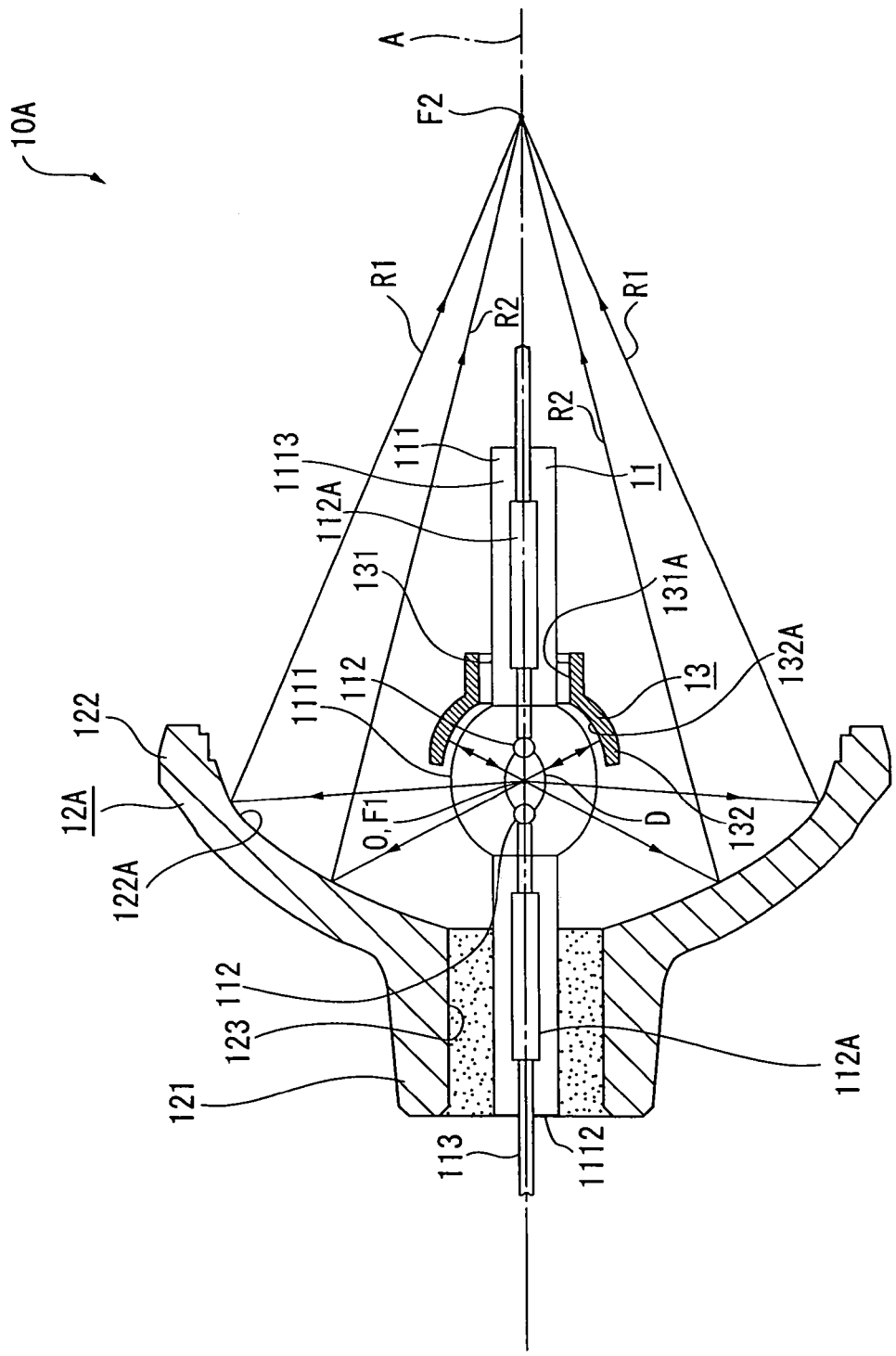
FIG. 11 is another cross section showing the outline of the light source device of the exemplary embodiment.

FIGS. 10 and 11 are cross sections each showing the outline of the light source device 10A of the second exemplary embodiment. Specifically, FIG. 10 shows an arrangement where a parabolic reflector is employed as the main reflecting mirror 12A. FIG. 11 shows an arrangement where an ellipsoidal reflector is employed as the main reflecting mirror 12.

It should be noted that, as shown in FIG. 10 or 11, the main reflecting mirror 12A is different from the main reflecting mirror 12 described in the first exemplary embodiment only in its shape, and the main reflecting mirror 12A includes the neck 121 (including the insertion hole 123) and the reflecting portion 122 (including the reflecting surface 122A) as with the main reflecting mirror 12.

As shown in FIG. 10 or 11, the sub-reflecting mirror 13 includes a substantially cylindrical neck 131 to which the sealing portion 1113 of the emitting tube 111 of the light source lamp 11 is inserted and a substantially hemispherical reflecting portion 132 extending from the neck 131, the neck 131 and the reflecting portion 132 being integrated.

The neck 131 is a portion for fixing the sub-reflecting mirror 13 to the light source lamp 11, and the sub-reflecting mirror 13 is attached to the light source lamp 11 by inserting the sealing portion 1113 of the light source lamp 11 into an insertion hole 131A as a cylindrical opening as shown in FIG. 10 or 11. The inner circumferential surface of the insertion hole 131A serves as an adhesive surface where an adhesive for fixing the neck 131 to the sealing portion 1113 is applied. By proving the neck 131 to the sub-reflecting mirror 13 as described above, a larger adhesive area of the sub-reflecting mirror 13 to the light source lamp 11 can be obtained as compared to an arrangement without the neck 131, so that a fixing condition of the sub-reflecting mirror 13 to the light source lamp 11 can be maintained properly.

As shown in FIG. 10 or 11, the reflecting portion 132 covers substantially front half of the emitting portion 1111 of the light source lamp 11 with the sub-reflecting mirror 13 being attached to the light source lamp 11, the reflecting portion 132 having a hemispherical shape.

The inner circumferential surface of the reflecting portion 132 serves as a reflecting surface 132A that is formed spherically corresponding to the spherical shape of the emitting portion 1111 of the light source lamp 11. The reflecting surface 132A is a cold mirror that reflects a visual ray and transmits an infrared ray and an ultraviolet ray, as with the reflecting surface 122A of the main reflecting mirror 12A.

The above-described sub-reflecting mirror 13 is made of an inorganic material with low expansion and high thermal conductance such as quartz and alumina ceramics.

When the main reflecting mirror 12A is formed by the parabolic reflector, by attaching the above-described sub-reflecting mirror 13 to the emitting tube 111, a light beam R2 irradiated from the emitting portion 1111 and irradiated toward an opposite side of the main reflecting mirror 12A (frontward) is irradiated in parallel to the illumination optical axis A as shown in FIG. 10. On the other hand, when the main reflecting mirror 12A is formed by the ellipsoidal reflector, the light beam R2 irradiated from the emitting portion 1111 and irradiated toward an opposite side of the main reflecting mirror 12A (frontward) is converged on the second focus position F2 in a manner same as the light beam R1 directly incident on the reflecting surface 122A of the main reflecting mirror 12A from the light source lamp 11.

Since the light source device 10 described in the first exemplary embodiment does not have the sub-reflecting mirror 13, the light beam irradiated from the light source lamp 11 have to be irradiated in parallel to the illumination optical axis A or converged on the second focus position F2 only by the main reflecting mirror 12.

In contrast, in the present exemplary embodiment, by providing the sub-reflecting mirror 13, since the light beam irradiated from the light source lamp 11 toward the opposite side of the main reflecting mirror 12A (frontward) can be reflected backward by the sub-reflecting mirror 13 so as to be incident on the reflecting surface 122A of the main reflecting mirror 12A, a size in an optical axis direction and an opening diameter of the main reflecting mirror 12A can be formed smaller as compared to the main reflecting mirror 12 described in the first exemplary embodiment. In other words, the light source device 10A and the projector 1 can be downsized, so that a layout for incorporating the light source device 10A in the projector 1 can be facilitated.

When the main reflecting mirror 12A is formed by the ellipsoidal reflector, by providing the sub-reflecting mirror 13, even when the first focus position F1 and the second focus position F2 of the main reflecting mirror 12A are positioned closer to each other to reduce the diameter of a converging spot in the second focus position F2, almost all the light beam irradiated from the emitting portion 1111 is converged on the second focus position F2 by the main reflecting mirror 12A and the sub-reflecting mirror 13A to be a usable light, thus greatly enhancing the light utilization efficiency. Accordingly, the light source lamp 11 with relatively low output can be employed, so that the temperature of the light source lamp 11 and the light source device 10A can be lowered.

Figure 12:
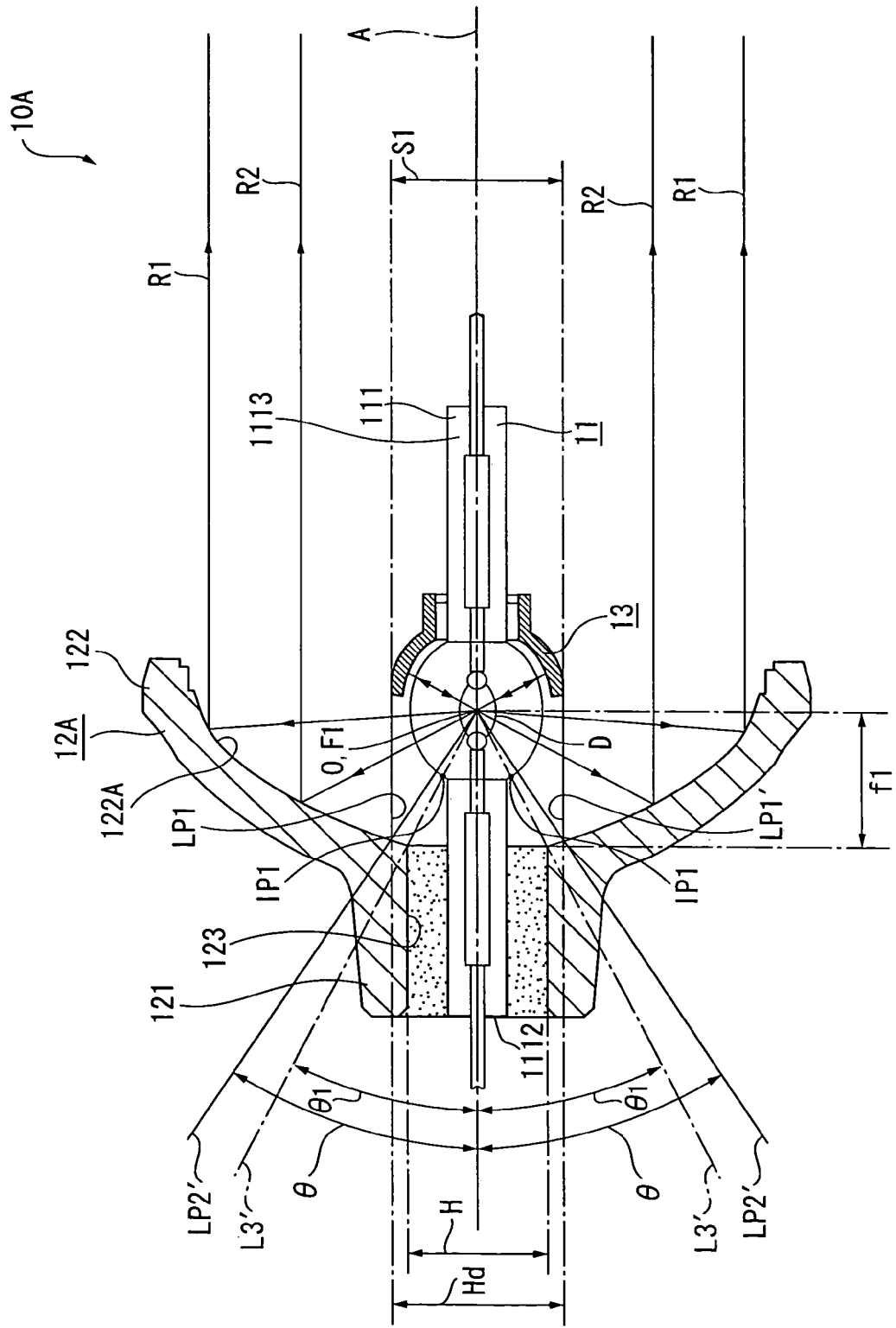
FIG. 12 is an illustration showing a usable-light reflection area and an unusable light reflection area in the exemplary embodiment.
Figure 13:
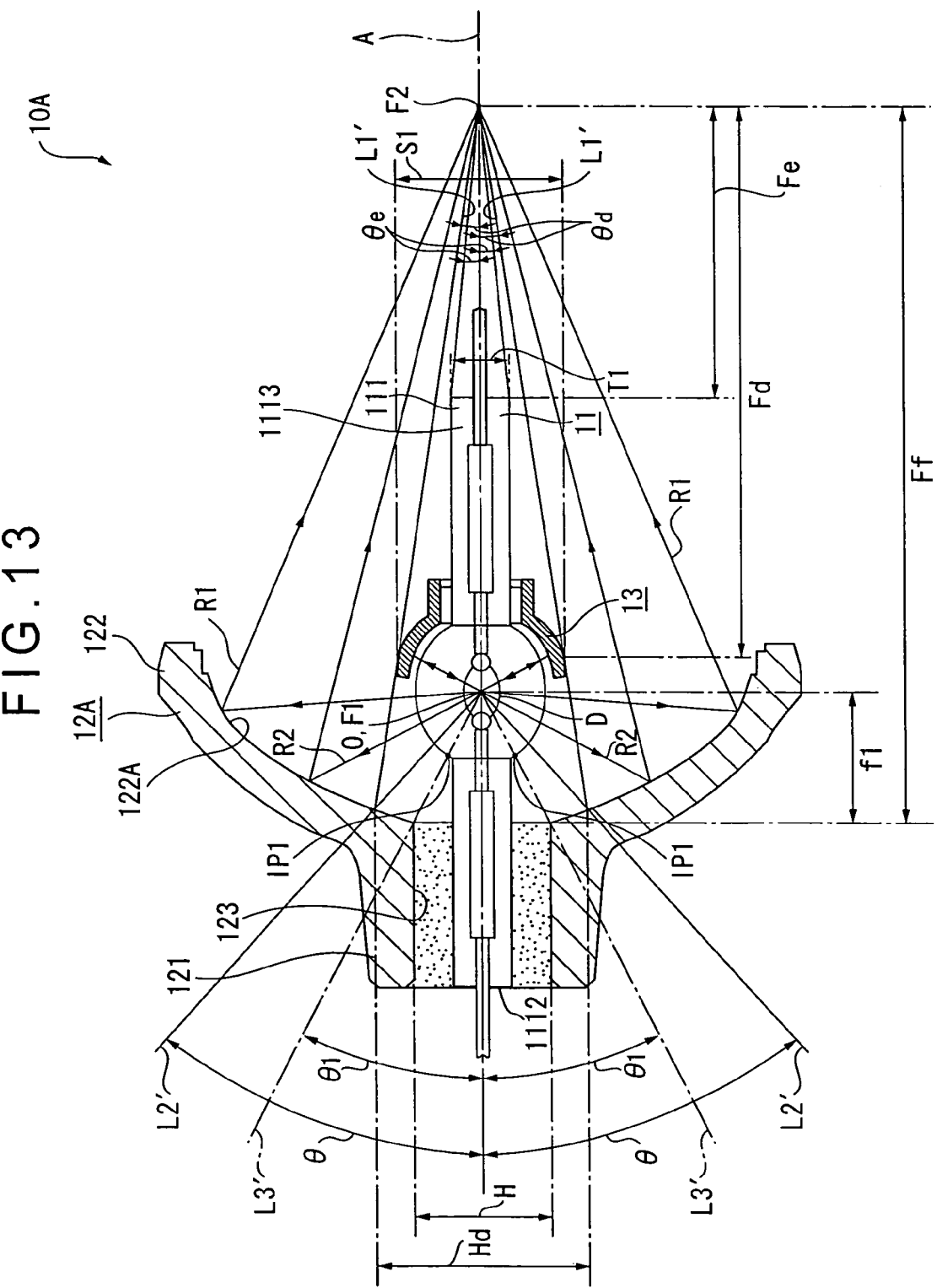
FIG. 13 is another illustration showing the usable-light reflection area and the unusable light reflection area in the exemplary embodiment.
Figure 14:
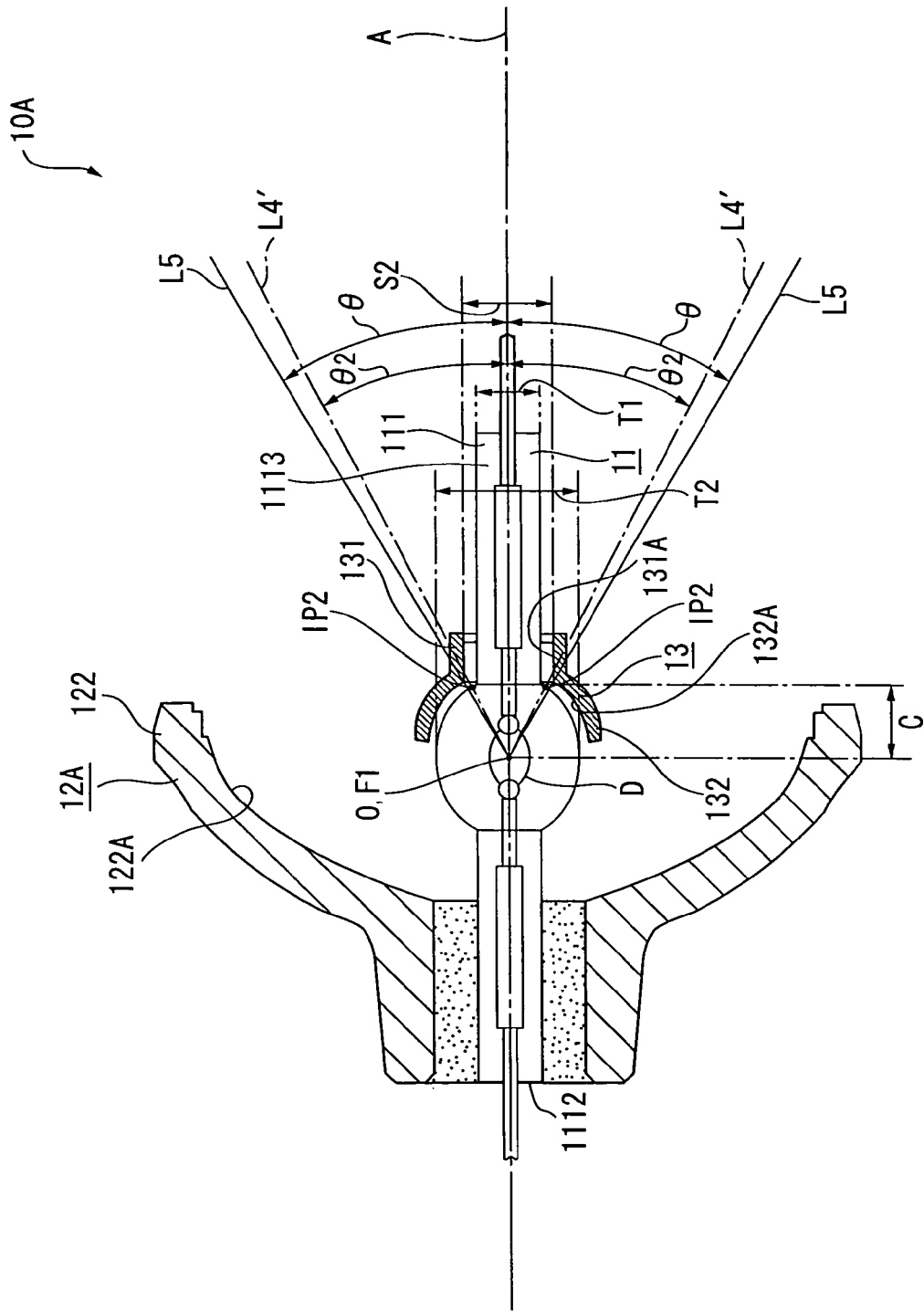
FIG. 14 is still another illustration showing the usable-light reflection area and the unusable light reflection area in the exemplary embodiment.

FIGS. 12 through 14 are illustrations each showing the usable-light reflection area and unusable light reflection areas. Specifically, FIG. 12 shows the usable-light reflection area and the unusable-light reflection areas in an arrangement where the parabolic reflector is employed as the main reflecting mirror 12A. FIG. 13 shows the usable-light reflection area and the unusable-light reflection areas in an arrangement where the ellipsoidal reflector is employed as the main reflecting mirror 12A. FIG. 14 shows the usable-light reflection area and the unusable-light reflection areas of the sub-reflecting mirror 13.

Since the light source device 10A of the present exemplary embodiment includes the sub-reflecting mirror 13, a second unusable-light reflection area of the main reflecting mirror 12A is an area where the light beam is shielded by the emitting tube 111 and the sub-reflecting mirror 13 even when the light is reflected by the reflecting surface 122A, which is different from the light source device 10 of the first exemplary embodiment.

As shown in FIG. 12, when the main reflecting mirror 12A is formed by the parabolic reflector, an area positioned within a cylindrical area enclosed by lines LP1' passing through the most-bulged portions of the sub-reflecting mirror 13 and parallel to the illumination optical axis A is the second unusable-light reflection area. Specifically, an intersecting position of the cylindrical area defining the second unusable-light reflection area of the main reflecting mirror 12A formed by the parabolic reflector and the reflecting surface 122A is a circle having diameter Hd defining a edge on the neck side of the usable-light reflection area of the main reflecting mirror 12A. When the main reflecting mirror 12A is formed by the parabolic reflector, the diameter Hd is equal to the largest diameter S1 of the sub-reflecting mirror 13, which is the outer diameter at the most-bulged portion of the sub-reflecting mirror 13. When the distance in the direction of the illumination optical axis A between the center position O of the arc image D and the edge on the neck side of the usable-light reflection area of the main reflecting mirror 12A is f1, angle θ formed by lines LP2' connecting the center position O of the arc image D with the edge on the neck side of the usable-light reflection area of the main reflecting mirror 12A and the illumination optical axis A can be defined by Formula 28 (shown below).

$$\theta = \mathrm{Tan}^{-1}(Hd/(2f1)) \qquad \text{[Formula 28]}$$

On the other hand, when the main reflecting mirror 12A is formed by the ellipsoidal reflector, since the light beam reflected by the reflecting surface 122A is converged on the second focus position F2, the second unusable-light reflection area of the main reflecting mirror 12A is an area positioned within a conical area enclosed by lines L1' connecting the most-bulged portions of the sub-reflecting mirror 13 or an end of the sealing portion 1113 with the second focus position F2, as shown in FIG. 13. As shown in FIG. 13, the lines L1' are inclined relative to the illumination optical axis A.

The conical area enclosed by the lines L1' connecting the most-bulged portions of the sub-reflecting mirror 13 with the second focus position F2 is, when the outer diameter at the most-bulged portion of the sub-reflecting mirror 13, i.e. the largest outer diameter of the sub-reflecting mirror 13 is S1, and the distance in the direction of the illumination axis A between the second focus position F2 of the main reflecting mirror 12A and the most-bulged portions of the sub-reflecting mirror 13 is Fd, a conical area in which the lines L1' connecting the most-bulged portions of the sub-reflecting mirror 13 with the second focus position F2 have angle θd defined by Formula 29 (shown below) relative to the illumination optical axis A.

$$\theta d = \mathrm{Tan}^{-1}(S1/(2Fd)) \qquad \text{[Formula 29]}$$

On the other hand, the conical area enclosed by the lines connecting the end of the sealing portion 1113 on the side away from the main reflecting mirror 12A with the second focus position F2 is, when the outer diameter of the sealing portion 1113 is T1, and the distance in the direction of the illumination optical axis A between the second focus position F2 of the main reflecting mirror 12A and the end of the sealing portion 1113 is Fe, a conical area in which the lines connecting the end of the sealing portion 1113 with the second focus position F2 have angle θe defined by Formula 30 (shown below) relative to the illumination optical axis A.

$$\theta e = \mathrm{Tan}^{-1}(T1/(2Fe)) \qquad \text{[Formula 30]}$$

Thus, as shown in FIG. 13, the second unusable-light reflection area of the main reflecting mirror 12A formed by the ellipsoidal reflector is positioned within the conical area enclosed in lines having greater angle of angle θd defined by Formula 29 and angle θe defined by Formula 30. Therefore, the diameter Hd of the circle defining the edge on the neck side of the usable-light reflection area of the reflecting surface 122A of the main reflecting mirror 12A is the diameter of a circle defining an intersecting position of the conical area enclosed by lines having greater angle of angle θd defined by Formula 29 and angle θe defined by Formula 30 and the reflecting surface 122A.

In other words, when the distance in the direction of the illumination optical axis A between the edge on the neck side of the usable-light reflection area of the reflecting surface 122A of the main reflecting mirror 12A formed by the ellipsoidal reflector and the second focus position F2 is Ff under the condition of angle θd>angle θe, the diameter Hd of the circle defining the edge on the neck side of the usable-light reflection area of the reflecting surface 122A of the main reflecting mirror 12A is a length defined by Formula 31 (shown below).

$$Hd = (Ff \cdot \tan \theta d) \cdot 2 \qquad \text{[Formula 31]}$$

On the other hand, when the distance in the direction of the illumination optical axis A between the edge on the neck side of the usable-light reflection area of the reflecting surface 122A of the main reflecting mirror 12A formed by the ellipsoidal reflector and the second focus position F2 is Ff under the condition of angle θd<angle θe, the diameter Hd of the circle defining the edge on the neck side of the usable-light reflection area of the reflecting surface 122A of the main reflecting mirror 12A is a length defined by Formula 32 (shown below).

$$Hd = (Ff \cdot \tan \theta e) \cdot 2 \qquad \text{[Formula 32]}$$

In the light source device 10A shown in FIG. 13, angle θd formed by the lines connecting the most-bulged portions of the sub-reflecting mirror 13 with the second focus position F2 and the illumination optical axis A is greater than angle θe formed by the lines connecting the end of the sealing portion 1113 and the second focus position F2 and the illumination optical axis A. Thus, an intersecting position of the conical area that is defined by the lines connecting the most-bulged portions of the sub-reflecting mirror 13 with the second focus position F2 as the second unusable-light reflection area of the main reflecting mirror 12A and the reflecting surface 122A is a circle having diameter Hd defining the edge on the neck side of the usable-light reflection area of the main reflecting mirror 12A. When the distance between the center position O of the arc image D and the edge on the neck side of the usable-light reflection area of the main reflecting mirror 12A is f1, angle θ formed by lines L2' connecting the center position O of the arc image D with the edge on the neck side of the usable-light reflection area of the main reflecting mirror 12A and the illumination optical axis A can be defined by Formula 33 (shown below).

$$\theta = \tan^{-1}(Hd/(2f1)) \qquad \text{[Formula 33]}$$

In the present exemplary embodiment, as shown in FIG. 12 or 13, when the angle formed by lines L3' connecting the inflection points IP1 on the main reflecting mirror 12A side of the emitting tube 111 with the center position O of the arc image D and the illumination optical axis A is θ1, the emitting tube 111 is manufactured by the manufacturing method of the emitting tube 111 described in the first exemplary embodiment so as to satisfy relation of Formula 34 (shown below).

$$\theta 1 \leq \tan^{-1}(Hd/(2f1)) \qquad \text{[Formula 34]}$$

In the present exemplary embodiment, as shown in FIG. 12 or 13, when the diameter of the insertion hole 123 of the main reflecting mirror 12A is H, the main reflecting mirror 12A is manufactured so as to satisfy relation of Formula 35 (shown below).

$$T1 < H \leq Hd \qquad \text{[Formula 35]}$$

Here, as shown in FIG. 14, the unusable-light reflection area of the sub-reflecting mirror 13 is an opening of the insertion hole 131A to which the sealing portion 1113 is inserted. That is to say, the light beam irradiated from the emitting portion 1111 and traveling toward the opening of the sub-reflecting mirror 13 is not reflected by the reflecting surface 132A of the sub-reflecting mirror 13, which is not used as the illumination light.

Thus, as shown in FIG. 14, when the diameter of the opening of the sub-reflecting mirror 13 is S2, and the distance in the direction of the illumination optical axis A between the opening of the sub-reflecting mirror 13 and the center position O of the arc image D of the emitting portion 1111 is C, the light beam (lines L5 in FIG. 14) passing through the center position O of the arc image D and having angle θ defined by Formula 36 (shown below) relative to the illumination optical axis A is the light beam that is incident with the smallest angle in the light beam incident on the reflecting surface 132A (usable-light reflection area) of the sub-reflecting mirror 13 (when the refraction on the outer circumferential surface of the emitting portion 1111 is not considered).

$$\theta = \tan^{-1}(S2/(2C)) \qquad \text{[Formula 36]}$$

In the present exemplary embodiment, as shown in FIG. 14, when the diameter of the opening of the insertion hole 131A of the sub-reflecting mirror 13 is S2, the distance in the direction of the illumination optical axis A between the opening of the sub-reflecting mirror 13 and the center position O of the arc image D is C, and the angle formed by lines L4' connecting the inflection points IP2 between the emitting tube 111 and the sealing portion 1113 on the sub-reflecting 13 side with the center position O of the arc image D and the illumination optical axis A is θ2, the emitting tube 111 is manufactured by the manufacturing method of the emitting tube 111 described in the first exemplary embodiment so as to satisfy relation of Formula 37 (shown below).

$$\theta 2 \leq \tan^{-1}(S2/(2C)) \qquad \text{[Formula 37]}$$

In the present exemplary embodiment, the sub-reflecting mirror 13 described above is manufactured so as to satisfy relation of Formula 38 (shown below).

$$T1 < S2 \leq T2 \qquad \text{[Formula 38]}$$

In the second exemplary embodiment described above, since the diameter H of the insertion hole 123 of the main reflecting mirror 12A is set to be equal to or smaller than the diameter Hd of the circle defining the edge on the neck side of the usable-light reflection area of the main reflecting mirror 12A, the insertion hole 123, i.e., the first unusable-light reflection area of the main reflecting mirror 12A can be securely positioned within the second unusable-light reflection area, so that the unusable-light reflection area of the main reflecting mirror 12A can be defined only to the second unusable-light reflection area. Therefore, by setting the diameter H of the insertion hole 123 as shown in Formula 35, the unusable-light reflection area of the main reflecting mirror 12A is not unnecessarily enlarged, which allows effective utilization of the light beam irradiated from the center position O of the arc image D.

By setting the diameter H of the insertion hole 123 to be greater than the diameter T1 of the sealing portions 1112 and 1113 as shown in Formula 35, the sealing portion 1112 can be inserted into the insertion hole 123, so that the light source lamp 11 can be properly supported by the neck 121.

By setting the diameter S2 of the opening of the insertion hole 131A of the sub-reflecting mirror 13 so as to be greater than the diameter T1 of the sealing portion 1113 as shown in Formula 38, the sealing portion 1113 can be inserted into the insertion hole 131A of the sub-reflecting mirror 13, so that the sub-reflecting mirror 13 can be properly attached to the sealing portion 1113. Further, the diameter S2 of the opening of the insertion hole 131A of the reflecting mirror 13 is set to be equal to or smaller than the outer diameter T2 of the emitting portion 1111 as shown in FIG. 38.

By disposing the light source lamp 11 so that the center position O of the arc image D is positioned on the first focus position F1 of the main reflecting mirror 12A and by setting angle θ1 formed by the lines L3' and the illumination optical axis A as shown in Formula 34, the inflection points IP1 between the emitting portion 1111 and the sealing portion 1112 on the main reflecting mirror 12A side can be positioned so that the light beam irradiated from the center position O of the arc image D toward the usable-light reflection area of the main reflecting mirror 12A and having the smallest angle relative to the illumination optical axis A under the condition where the refraction on the outer circumferential surface of the emitting portion 1111 is not considered can be irradiated from the emitting portion as the first beam.

Incidentally, in a case where θ1 is set to be out of the range of Formula 34, for instance, when θ1 is greater than $\text{Tan}^{-1}(\text{Hd}/(2\text{f1}))$, the inflection points IP1 are so positioned that the lines L3' connecting the inflection points IP1 between the emitting portion 1111 and the sealing portion 1112 on the main reflecting mirror 12A side with the center position O of the arc image D are positioned out of the second unusable-light reflection area of the main reflecting mirror 12A described above, namely within the usable-light reflection area. By positioning the inflection points IP1 as described above, a part of the light beam irradiated from the center position O of the arc image D and traveling toward the usable-light reflection area of the main reflecting mirror 12A under the condition where the refraction on the outer circumferential surface of the emitting portion 1111 is not considered is refracted on the outer circumferential surface of the emitting portion 1111 via the emitting tube 111 to be the second beam, which travels toward the second unusable-light reflection area of the main reflecting mirror 12A. Therefore, amount of the light beam refracted on the outer circumferential surface of the emitting portion 1111 via the emitting tube 111 and irradiated from the emitting portion 1111 and traveling toward the usable-light reflection area of the main reflecting mirror 12A becomes small, in other words, the light utilization efficiency of the light beam irradiated from the emitting portion 1111 is lowered.

In the present exemplary embodiment, by setting θ1 to be equal to or smaller than $\text{Tan}^{-1}(\text{Hd}/2\text{f1})$ as shown in Formula 34, the lines L3' connecting the inflection points the IP1 between the emitting portion 1111 and the sealing portion 1112 on the main reflecting mirror 12A side with the center position O of the arc image D are positioned on the edge on the neck side of the usable-light reflection area of the main reflecting mirror 12A or within the unusable-light reflection area. In other words, the inflection points IP1 can be positioned so that the light beam irradiated from the center position O of the arc image D to be incident on the usable-light reflection area of the main reflecting mirror 12A with the smallest angle relative to the illumination optical axis A under the condition where the refraction on the outer circumferential surface of the emitting portion 1111 is not considered can be securely incident on the usable-light reflection area. Thus, all of the light beam irradiated from the center position O of the arc image D and traveling toward the usable-light reflection area of the main reflecting mirror 12A under the condition where the refraction on the outer circumferential surface of the emitting portion 1111 is not considered is refracted on the outer circumferential surface of the emitting portion 1111 via the emitting tube 111 to be the first beam, which securely travels toward the usable-light reflection area of the main reflecting mirror 12A without traveling toward the second unusable-light reflection area of the main reflecting mirror 12A. Further, the light beam irradiated from the center position O of the arc image D and traveling toward the unusable-light reflection area of the main reflecting mirror 12A under the condition where the refraction on the outer circumferential surface of the emitting portion 1111 is not considered can also be set so that a part of the light beam refracted on the outer circumferential surface of the emitting portion 1111 via the emitting tube 111 to be the first beam, which travels toward the usable-light reflection area of the main reflecting mirror 12A. Therefore, amount of the light beam refracted on the outer circumferential surface of the emitting portion 1111 via the emitting tube 111 to be irradiated from the emitting portion 1111 and traveling toward the usable-light reflection area of the main reflecting mirror 12A can be increased, in other words, the light utilization efficiency of the light beam irradiated from the emitting portion 1111 can be enhanced.

By disposing the light source lamp 11 so that the center position O of the arc image D is positioned on the focus position of the sub-reflecting mirror 13 and setting angle θ2 formed by the lines L4' and the illumination optical axis A as shown in Formula 37, the inflection points IP2 on the sub-reflecting mirror 13 side in the emitting portion 1111 can be positioned so that the light beam irradiated from the center position O of the arc image D toward the usable-light reflection area of the sub-reflecting mirror 13 and having the smallest angle relative to the illumination optical axis A under the condition where the refraction on the outer circumferential surface of the emitting portion 1111 is not considered can be irradiated from the emitting portion 1111 as the first beam.

Incidentally, in a case where θ2 is set to be out of the range of Formula 37, for instance, when θ2 is greater than $\text{Tan}^{-1}(\text{S2}/(2\text{C}))$, the inflection points IP2 are positioned so that the lines L4' connecting the inflection points IP2 between the emitting portion 1111 and the sealing portion 1113 on the sub-reflecting mirror 13 side with the center position O of the arc image D are positioned out of the opening of the insertion hole 131A (unusable-light reflection area) of the sub-reflecting mirror 13, namely within the reflecting surface 132A (usable-light reflection area). By positioning the inflection points IP2 as described above, a part of the light beam irradiated from the center position O of the arc image D and traveling toward reflecting surface 132A (usable-light reflection area) of the sub-reflecting mirror 13 under the condition where the refraction on the outer circumferential surface of the emitting portion 1111 is not considered is refracted on the outer circumferential surface of the emitting portion 1111 via the emitting tube 111 to be the second beam, which travels toward the insertion hole 131A (unusable-light reflection area) of the sub-reflecting mirror 13. Therefore, amount of the light beam refracted on the outer circumferential surface of the emitting portion 1111 via the emitting tube 111 to be irradiated from the emitting portion 1111 and traveling toward the reflecting surface 132A (usable-light reflection area) of the sub-reflecting mirror 13 becomes small, in other words, the light utilization efficiency of the light beam irradiated from the emitting portion 1111 is lowered.

In the present exemplary embodiment, by setting θ2 to be equal to or smaller than $\mathrm{Tan}^{-1}(S2/(2C))$ as shown in Formula 37, the inflection points IP2 are positioned so that the lines L4' connecting the inflection points IP2 between the emitting portion 1111 and the sealing portion 1113 on the sub-reflecting mirror 13 side with the center position O of the arc image D are positioned on the edge on the neck side of the usable-light reflection area of the sub-reflecting mirror 13 or within the insertion hole 131A. In other words, the inflection points IP2 can be positioned so that the light beam incident with the smallest angle in the light beam irradiated from the center position O of the arc image D and incident on the reflecting surface 132A (usable-light reflection area) of the main reflecting mirror 13 under the condition where the refraction on the outer circumferential surface of the emitting portion 1111 is not considered can be securely incident on the usable-light reflection area. Thus, all of the light beam irradiated from the center position O of the arc image D and traveling toward the reflecting surface 132A (usable-light reflection area) of the sub-reflecting mirror 13 under the condition where the refraction on the outer circumferential surface of the emitting portion 1111 is not considered is refracted on the outer circumferential surface of the emitting portion 1111 via the emitting tube 111 to be the first beam, which securely travels toward the reflecting surface 132A (usable-light reflection area) of the sub-reflecting mirror 13 without traveling toward the insertion hole 131A (unusable-light reflection area) of the sub-reflecting mirror 13. Further, the light beam irradiated from the center position O of the arc image D and traveling toward the insertion hole 131A (unusable-light reflection area) of the sub-reflecting mirror 13 under the condition where the refraction on the outer circumferential surface of the emitting portion 1111 is not considered can also be set so that a part of the light beam refracted on the outer circumferential surface of the emitting portion 1111 via the emitting tube 111 to be the first beam travels toward the reflecting surface 132A (usable-light reflection area) of the sub-reflecting mirror 13. Therefore, amount of the light beam refracted on the outer circumferential surface of the emitting portion 1111 via the emitting tube 111 to be irradiated from the emitting portion 1111 and traveling toward the reflecting surface 132A (usable-light reflection area) of the sub-reflecting mirror 13 can be increased, in other words, the light utilization efficiency of the light beam irradiated from the emitting portion 1111 can be further enhanced.

3 Third Exemplary Embodiment

Next, a third exemplary embodiment of the present invention will be described with reference to the attached drawings.

In the following description, the same components as those in the first and second exemplary embodiments are indicated by the same reference symbols or numerals for omitting or simplifying the detailed description thereof.

In the first and second exemplary embodiments, the emitting tube 111 is manufactured by blow-molding the base tube 111' and then machining near the boundaries of the emitting portion 1111 and sealing portions 1112 and 1113 of the base tube 111'.

In the third exemplary embodiment, an emitting tube 111A is so manufactured by blow-molding as to satisfy the relations of Formula 26 described in the first exemplary embodiment and Formulae 34 and 37 in the second exemplary embodiment. That is, the present exemplary embodiment is different from the first and second exemplary embodiments only in the manufacturing method of the emitting tube, and other arrangements are the same as those in the first and second exemplary embodiments.

Figure 15:
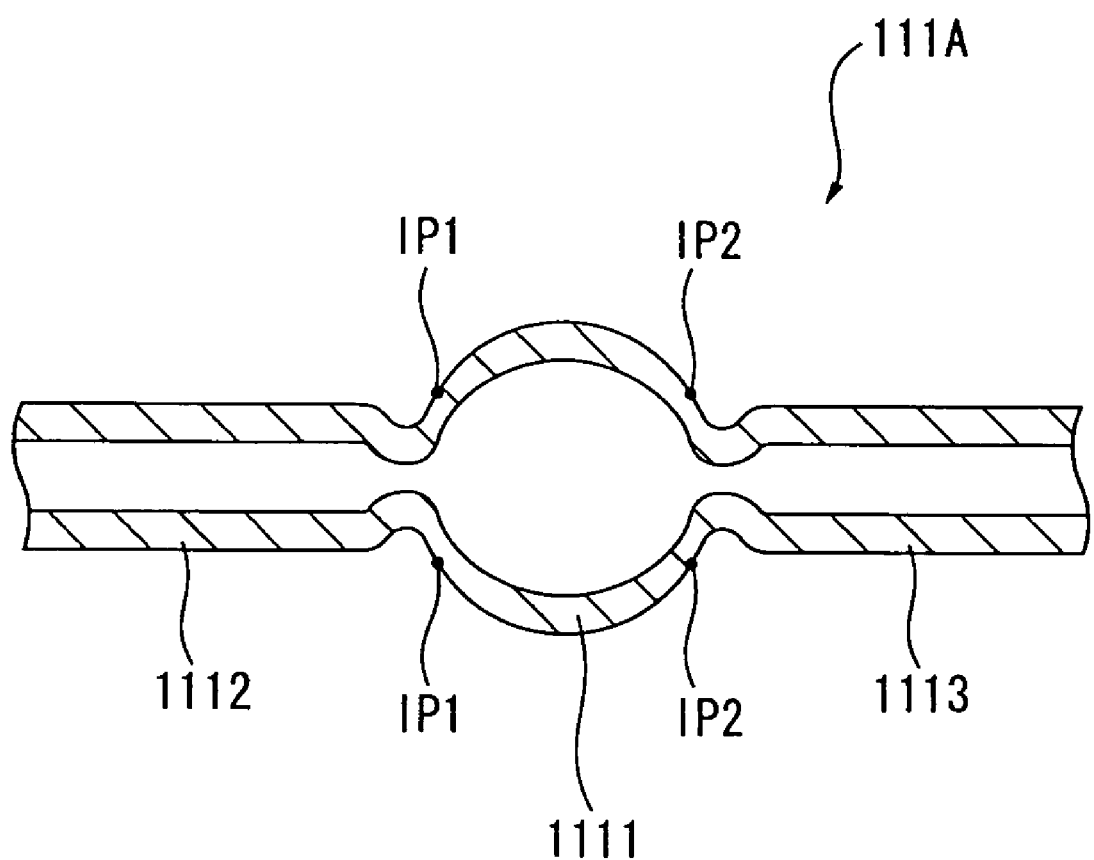
FIG. 15 is a cross section showing an example of an emitting tube manufactured by a manufacturing method of a third exemplary embodiment.

Specifically, FIG. 15 is a cross section showing an example of the emitting tube 111A manufactured by a manufacturing method of the third exemplary embodiment.

The emitting tube 111A has an arrangement of which are the same as those of the emitting tube 111 described in the first and second exemplary embodiments, and includes the emitting portion 1111 and the sealing portions 1112 and 1113 as with the emitting tube 111, as shown in FIG. 15.

The emitting tube 111A is manufactured by the manufacturing method shown below.

First, a quartz glass tube is heat-softened on a predetermined position which is to be the emitting portion. Next, a die (not shown) that defines a shape of the emitting portion is applied to the predetermined portion from the outer circumferential surface of the quartz glass tube, and the predetermined position is inflated by blowing air into the quartz glass tube.

Here, the inflection points IP1 and IP2 satisfying the relations of Formulae 26, 34 and 37 described in the first and second exemplary embodiments are set on the inner circumferential surface of the die.

The air is sent until the outer circumferential surface of the inflated quartz glass tube touches the inner circumferential surface of the die. Then, the predetermined position is hardened by cooling. The emitting tube 111A is manufactured by the blow-molding described above.

In the emitting tube 111A manufactured by the manufacturing method described above, for instance, vicinities of the boundaries of the emitting portion 1111 and the sealing portions 112 and 113 are constricted as shown in FIG. 15.

In the third exemplary embodiment, by blow-molding using a die with positions of the inflection points having been set in advance, the desired inflection points IP1 and IP2 can be formed on the emitting portion 1111, thereby easily enhancing the light utilization efficiency of the light beam irradiated from the emitting portion 1111. Further, since after-treatment such as machining is not required, the light source device 10A capable of enhancing the light utilization efficiency can be easily manufactured.

While the present invention has been described above with the preferable exemplary embodiments, the present invention is not limited to the above-described exemplary embodiments, but includes improvements and modifications as long as an object of the present invention can be achieved.

In the exemplary embodiments described above, although the light source lamp 11 is disposed so that the center position O of the arc image D is positioned on the first focus position F1 of the main reflecting mirror 12, 12A (on the focus position when the main reflecting mirror is formed by the parabolic reflector), the light source lamp 11 may be disposed so that the first focus position F1 (focus position) of the main reflecting mirror 12, 12A is positioned on the arc image D.

In the second exemplary embodiment, although the light source lamp 11 is disposed so that the center position O of the arc image D is positioned on the focus position of the sub-reflecting mirror 13, the light source lamp 11 may be disposed so that the focus position of the sub-reflecting mirror 13 is disposed in the arc image D.

In the exemplary embodiments described above, the insertion hole 123 of the neck 121 of the main reflecting mirror 12, 12A is substantially cylindrical, but the arrangement is not limited thereto.

For instance, the insertion hole 123 may be formed in a shape where the diameter of the insertion hole 123 is gradually increased from the base end connected to the reflecting portion 122 toward the tip end.

In contrast, for instance, the insertion hole 123 may be formed in a shape where the diameter of the insertion hole 123 is gradually decreased from the base end connected to the reflecting portion 122 toward the tip end.

Further, for instance, the insertion hole 123 may be formed in a shape where steps dented backward relative to the reflecting surface 122A and provided continuously and circumferentially around a cylindrical axis of the insertion hole 123 are provided on a connecting portion of the insertion hole 123 and the reflecting surface 122A.

Still further, for instance, the insertion hole 123 may have a narrowest portion with smallest diameter on the inner circumferential surface thereof.

Whichever shape of the above is employed for the insertion hole 123, the diameter H of the insertion hole 123 defined by Formulae 15, 20 shown in the exemplary embodiments described above corresponds to the opening diameter of the base end side connecting to the reflecting portion 122.

In the second exemplary embodiment, although the sub-reflecting mirror 13 includes the neck 131, the neck 131 may not be provided. The shape of the insertion hole 131A of the neck 131 may not be substantially cylindrical but employ other shapes as with the shape of the insertion hole 123 of the neck 121 described above.

In the exemplary embodiments described above, only an example of a projector 1 having three liquid crystal panels 42R, 42G and 42B is exemplified. However, the present invention can also be applied to a projector having only one liquid crystal panel, two liquid crystal panels or four or more liquid crystal panels.

In the exemplary embodiments described above, the transmissive-type liquid crystal panel having different light-incident side and light-irradiation side is employed. However, a reflective liquid crystal panel having a common light-incident side and irradiation side may also be employed.

In the exemplary embodiments described above, although the liquid crystal panel is employed as the optical modulator, optical modulator other than the liquid crystal panel, such as a device using a micro mirror, may also be employed. In such case, the incident-side and irradiation-side polarization plates may not be provided.

In the exemplary embodiments described above, only a front-type projector that projects an image in a direction for observing a screen is exemplified, but the present invention may also be applied to a rear-type projector that projects an image in a direction opposite to the direction for observing the screen.

In the exemplary embodiments described above, although the light source device of the present invention is applied to the projector, the light source device of the present invention may be applied to other optical appliances.

Although the best mode for implementing the present invention has been disclosed above, the present invention is not limited thereto. In other words, while the present invention is mainly illustrated and described on the specific exemplary embodiments, a person skilled in the art can modify the specific arrangement such as shape, material, quantity in the above-described exemplary embodiments as long as a technical idea and an object of the present invention can be achieved.

Therefore, the description limiting the shapes and the materials disclosed above is intended to be illustrative for easier understanding and not to limit the invention, hence the present invention includes the description using a name of component without a part of or all of the limitation on the shape and the material etc.

The priority applications Numbers JP2004-267407 and JP2005-182336 upon which this patent application is based is hereby incorporated by reference.

What is claimed is:

1. A light source device comprising:
a light source lamp including an emitting tube having a discharge space and a pair of electrodes disposed in the discharge space of the emitting tube; and
a reflector that reflects a light beam irradiated from the light source lamp,
the emitting tube includes an emitting portion having the discharge space thereinside, sealing portions provided on both sides of the emitting portion and a curved surface connecting the outer circumferential surface of the emitting portion and the outer circumferential surface of the sealing portion,
the reflector includes a cylindrical neck extending along a first sealing portion of the sealing portions of the emitting tube and a reflecting portion that extends from a base end in an extending direction of the neck to have a substantially concave cross section, the reflecting portion reflecting the light beam irradiated from the light source lamp to align in a predetermined direction,
the light source lamp is so disposed that an emitting center of the emitting portion is positioned on a focus position of the reflecting portion of the reflector,
the emitting tube has an inflection point on the curved surface at which refraction direction of the light beam irradiated from the emitting center changes when being irradiated from the outer circumferential surface of the emitting portion, and
relations of $\theta 1 \leq \text{Tan}^{-1}(Hd/(2F))$ and $T1 < H \leq Hd$ are established, where a diameter of a circle defining an edge on the neck side of a usable-light reflection area of the reflecting portion of the reflector is Hd, a distance between the edge on the neck side of the usable-light reflection area of the reflecting portion of the reflector and the emitting center of the emitting portion in a central axis direction of the light beam irradiated from the light source device is F, an opening diameter of the neck on the base end in the extending direction is H, a diameter of the sealing portion is T1, and an angle formed by a line connecting the inflection point between the emitting portion and the first sealing portion with the emitting center of the emitting portion and the central axis of the light beam irradiated from the light source device is $\theta 1$.

2. The light source device according to claim 1,
the inflection point is positioned so that the line connecting the inflection point between the emitting portion and the first sealing portion with the emitting center of the emitting portion intersects the edge on the neck side of the usable-light reflection area of the reflecting portion of the reflector.

3. The light source device according to claim 1,
the edge on the neck side of the usable-light reflection area around the neck of the reflecting portion of the reflector is a boundary of an area where a light irradiated as an illumination light of the light source device is reflected and another area where a light shielded by the emitting tube is reflected in the reflecting portion of the reflector.

4. A light source device comprising:
a light source lamp including an emitting tube having a discharge space and a pair of electrodes disposed in the discharge space of the emitting tube;
a reflector for reflecting a light beam irradiated from the light source lamp; and
a sub-reflecting mirror with a reflecting surface thereof being disposed opposite to a reflecting surface of the reflector that reflects a part of the light beam irradiated from the light source lamp toward the discharge space,
the emitting tube includes an emitting portion having the discharge space thereinside, sealing portions provided on both sides of the emitting portion and a curved surface connecting the outer circumferential surface of the emitting portion and the outer circumferential surface of the sealing portion,
the reflector includes a cylindrical neck extending along a first sealing portion of the sealing portions of the emitting tube and a reflecting portion that extends from a base end in an extending direction of the neck to have a substantially concave cross section, the reflecting portion reflecting the light beam irradiated from the light source lamp to align in a predetermined direction,
the light source lamp is so disposed that an emitting center of the emitting portion is positioned on a focus position of the reflecting portion of the reflector,
the sub-reflecting mirror is formed in a hemispherical shape covering an emitting portion of the emitting tube, the sub-reflecting mirror having an opening to which the second sealing portion of the emitting tube can be inserted for attaching the sub-reflecting mirror to the emitting tube,
the emitting tube has an inflection point on the curved surface at which refraction direction of the light beam irradiated from the emitting center changes when being irradiated from the outer circumferential surface of the emitting portion, and
relations of $$\theta 1 \leq \text{Tan}^{-1}(Hd/(2F)) \text{ and}$$

$$T1 < H \leq Hd$$

are established, where a diameter of a circle defining an edge on the neck side of a usable-light reflection area of the reflecting portion of the reflector is Hd, a distance between the an edge on the neck side of the usable-light reflection area of the reflecting portion of the reflector and the emitting center of the emitting portion in a central axis direction of the light beam irradiated from the light source device is F, an opening diameter of the neck on the base end in the extending direction is H, a diameter of the sealing portion is T1, and an angle formed by a line connecting the inflection point between the emitting portion and the first sealing portion with the emitting center of the emitting portion and the central axis of the light beam irradiated from the light source device is θ1.

5. The light source device according to claim 4,
the inflection point is positioned so that the line connecting the inflection point between the emitting portion, and the first sealing portion with the emitting center of the emitting portion intersects the edge on the neck side of the usable-light reflection area of the reflecting portion of the reflector.

6. The light source device according to claim 4,
the edge on the neck side of the usable-light reflection area of the reflecting portion of the reflector is a boundary of an area where a light irradiated as an illumination light of the light source device is reflected and another area where a light shielded by the emitting tube is reflected of the reflecting portion of the reflector.

7. The light source device according to claim 4,
the edge on the neck side of the usable-light reflection area of the reflecting portion of the reflector is a boundary of an area where a light irradiated as an illumination light of the light source device is reflected and another area where a light shielded by the sub-reflecting mirror is reflected in the reflecting portion of the reflector.

8. The light source device according to claim 4,
relations of $$\theta 2 \leq \text{Tan}^{-1}(S2/(2C)) \text{ and}$$

$$T1 < S2 \leq T2$$

are established, where a diameter of the emitting portion is T2, an opening diameter of the sub-reflecting mirror is S2, a distance between the opening of the sub-reflecting mirror and the emitting center of the emitting portion in the central axis direction of the light beam irradiated from the light source device is C, and an angle formed by the line connecting the inflection point between the emitting portion and the second sealing portion with the emitting center of the emitting portion and the central axis of the light beam irradiated from the light source device is θ2.

9. The light source device according to claim 8,
the inflection point is positioned so that the line connecting the inflection point between the emitting portion and the second sealing portion with the emitting center of the emitting portion intersects the opening of the sub-reflecting mirror.

10. The light source device according to claim 8,
angle θ1 and angle θ2 are equal.

11. The light source device according to claim 1,
the inflection point of the emitting tube is moved to a position satisfying the relations by grinding and/or polishing the outer circumferential surface of the emitting portion.

12. The light source device according to claim 4,
the inflection point of the emitting tube is moved to a position satisfying the relations by grinding and/or polishing the outer circumferential surface of the emitting portion.

13. The light source device according to claim 1,
the emitting tube is a molding blow-molded using a die that is capable of forming the inflection point satisfying the relations.

14. The light source device according to claim 4,
the emitting tube is a molding blow-molded using a die that is capable of forming the inflection point satisfying the relations.

15. The light source device according to claim 1, the emitting center is an intersecting point of a central axis of the emitting tube along the extending direction of the sealing portions and a cross section of the largest diameter of the emitting portion along a plane orthogonal to the central axis.

16. The light source device according to claim 4, the emitting center is an intersecting point of a central axis of the emitting tube along the extending direction of the sealing portions and a cross section of the largest diameter of the emitting portion along a plane orthogonal to the central axis.

17. A projector comprising:

a light source device including a light source lamp having an emitting tube having a discharge space and a pair of electrodes disposed in the discharge space of the emitting tube and a reflector that reflects a light beam irradiated from the light source lamp;

an optical modulator that modulates a light beam irradiated from the light source device in accordance with image information; and a projection optical device that projects the light beam modulated by the optical modulator in an enlarged manner, the emitting tube includes an emitting portion having the discharge space thereinside, sealing portions provided on both sides of the emitting portion and a curved surface connecting the outer circumferential surface of the emitting portion and the outer circumferential surface of the sealing portion, the reflector includes a cylindrical neck extending along a first sealing portion of the sealing portions of the emitting tube and a reflecting portion that extends from a base end in an extending direction of the neck to have a substantially concave cross section, the reflecting portion reflecting the light beam irradiated from the light source lamp to align in a predetermined direction, the light source lamp is so disposed that an emitting center of the emitting portion is positioned on a focus position of the reflecting portion of the reflector, the emitting tube has an inflection point on the curved surface at which refraction direction of the light beam irradiated from the emitting center changes when being irradiated from the outer circumferential surface of the emitting portion, and relations of $\theta 1 \leq \mathrm{Tan}^{-1}(Hd/(2F))$ and $T1 < H \leq Hd$ are established, where a diameter of a circle defining an edge on the neck side of a usable-light reflection area of the reflecting portion of the reflector is Hd, a distance between the edge on the neck side of the usable-light reflection area of the reflecting portion of the reflector and the emitting center of the emitting portion in a central axis direction of the light beam irradiated from the light source device is F, an opening diameter of the neck on the base end in the extending direction is H, a diameter of the sealing portion is T1, and an angle formed by a line connecting the inflection point between the emitting portion and the first sealing portion with the emitting center of the emitting portion and the central axis of the light beam irradiated from the light source device is θ1.

18. The projector according to claim 17, the inflection point is positioned so that the line connecting the inflection point between the emitting portion and the first sealing portion with the emitting center of the emitting portion intersects the edge on the neck side of the usable-light reflection area of the reflecting portion of the reflector.

19. The projector according to claim 17, the edge on the neck side of the usable-light reflection area of the reflecting portion of the reflector is a boundary of an area where a light irradiated as an illumination light of the light source device is reflected and another area where a light shielded by the emitting tube is reflected in the reflecting portion of the reflector.

20. A projector comprising:

a light source device including a light source lamp having an emitting tube having a discharge space and a pair of electrodes disposed in the discharge space of the emitting tube, a reflector that reflects a light beam irradiated from the light source lamp, and a sub-reflecting mirror with a reflecting surface thereof being disposed opposite to a reflecting surface of the reflector that reflects a part of the light beam irradiated from the light source lamp toward the discharge space;

an optical modulator that modulates a light beam irradiated from the light source device in accordance with image information; and a projection optical device that projects the light beam modulated by the optical modulator in an enlarged manner, the emitting tube includes an emitting portion having the discharge space thereinside, sealing portions provided on both sides of the emitting portion and a curved surface connecting the outer circumferential surface of the emitting portion and the outer circumferential surface of the sealing portion, the reflector includes a cylindrical neck extending along a first sealing portion of the sealing portions of the emitting tube and a reflecting portion that extends from a base end in an extending direction of the neck to have a substantially concave cross section, the reflecting portion reflecting the light beam irradiated from the light source lamp to align in a predetermined direction, the light source lamp is so disposed that an emitting center of the emitting portion is positioned on a focus position of the reflecting portion of the reflector, the sub-reflecting mirror is formed in a hemispherical shape covering an emitting portion of the emitting tube, the sub-reflecting mirror having an opening to which the second sealing portion of the emitting tube can be inserted for attaching the sub-reflecting mirror to the emitting tube, the emitting tube has an inflection point on the curved surface at which refraction direction of the light beam irradiated from the emitting center changes when being irradiated from the outer circumferential surface of the emitting portion, and relations of $\theta 1 \leq \mathrm{Tan}^{-1}(Hd/(2F))$ and $T1 < H \leq Hd$ are established, where a diameter of a circle defining an edge on the neck side of a usable-light reflection area of the reflecting portion of the reflector is Hd, a distance between the edge on the neck side of the usable-light reflection area of the reflecting portion of the reflector and the emitting center of the emitting portion in a central axis direction of the light beam irradiated from the light source device is F, an opening diameter of the neck on the base end in the extending direction is H, a diameter of the sealing portion is T1, and an angle formed by a line connecting the inflection point between the emitting portion and the first sealing portion with the emitting center of the emitting portion and the central axis of the light beam irradiated from the light source device is θ1.

21. The projector according to claim 20,
the inflection point is positioned so that the line connecting the inflection point between the emitting portion and the first sealing portion with the emitting center of the emitting portion intersects the edge on the neck side of the usable-light reflection area of the reflecting portion of the reflector.

22. The projector according to claim 20,
the edge on the neck side of the usable-light reflection area of the reflecting portion of the reflector is a boundary of an area where a light irradiated as an illumination light of the light source device is reflected and another area where a light shielded by the emitting tube is reflected of the reflecting portion of the reflector.

23. The projector according to claim 20,
the edge on the neck side of the usable-light reflection area of the reflecting portion of the reflector is a boundary of an area where a light irradiated as an illumination light of the light source device is reflected and another area where a light shielded by the sub-reflecting mirror is reflected in the reflecting portion of the reflector.

24. The projector according to claim 20,
relations of $$\theta2 \leq \mathrm{Tan}^{-1}(S2/(2C)) \text{ and}$$

$$T1 < S2 \leq T2$$

are established, where a diameter of the emitting portion is T2, an opening diameter of the sub-reflecting mirror is S2, a distance between the opening of the sub-reflecting mirror and the emitting center of the emitting portion in the central axis direction of the light beam irradiated from the light source device is C, and an angle formed by the line connecting the inflection point between the emitting portion and the second sealing portion with the emitting center of the emitting portion and the central axis of the light beam irradiated from the light source device is θ2.

25. The projector according to claim 24,
the inflection point is positioned so that the line connecting the inflection point between the emitting portion and the second sealing portion with the emitting center of the emitting portion intersects the opening of the sub-reflecting mirror.

26. The projector according to claim 24,
angle θ1 and angle θ2 are equal.

27. The projector according to claim 17,
the inflection point of the emitting tube is moved to a position satisfying the relations by grinding and/or polishing the outer circumferential surface of the emitting portion.

28. The projector according to claim 20,
the inflection point of the emitting tube is moved to a position satisfying the relations by grinding and/or polishing the outer circumferential surface of the emitting portion.

29. The projector according to claim 17,
the emitting tube is a molding blow-molded using a die that is capable of forming the inflection point satisfying the relations.

30. The projector according to claim 20,
the emitting tube is a molding blow-molded using a die that is capable of forming the inflection point satisfying the relations.

31. The projector according to claim 17,
the emitting center is an intersecting point of a central axis of the emitting tube along the extending direction of the sealing portions and a cross section of the largest diameter of the emitting portion along a plane orthogonal to the central axis.

32. The projector according to claim 20,
the emitting center is an intersecting point of a central axis of the emitting tube along the extending direction of the sealing portions and a cross section of the largest diameter of the emitting portion along a plane orthogonal to the central axis.

* * * * *